(12) United States Patent
Fernandez et al.

(10) Patent No.: US 7,565,611 B2
(45) Date of Patent: Jul. 21, 2009

(54) BINARY CACHE FILE FORMAT FOR THEMEING THE VISUAL APPEARANCE OF A COMPUTER SYSTEM

(75) Inventors: Roland L. Fernandez, Woodinville, WA (US); Christopher A. Evans, Sammamish, WA (US); Richard W. Stoakley, Seattle, WA (US); Scott S. Hysom, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 10/918,153

(22) Filed: Aug. 12, 2004

(65) Prior Publication Data

US 2005/0081162 A1   Apr. 14, 2005

Related U.S. Application Data

(60) Division of application No. 09/827,993, filed on Apr. 5, 2001, now Pat. No. 7,137,066, and a continuation-in-part of application No. 09/670,791, filed on Sep. 27, 2000, now Pat. No. 6,873,337.

(60) Provisional application No. 60/195,607, filed on Apr. 6, 2000, provisional application No. 60/195,593, filed on Apr. 6, 2000.

(51) Int. Cl.
*G06F 3/048* (2006.01)
(52) U.S. Cl. ............... 715/744; 715/248; 715/746; 715/762; 715/765
(58) Field of Classification Search ................ 715/522, 715/746, 744, 248, 762, 765
See application file for complete search history.

(56) References Cited

U.S. PATENT DOCUMENTS

| 5,327,529 | A | * | 7/1994 | Fults et al. .................. 715/762 |
| 5,596,702 | A | * | 1/1997 | Stucka et al. ............... 715/746 |
| 5,603,034 | A | * | 2/1997 | Swanson .................... 717/111 |
| 5,959,624 | A |   | 9/1999 | Johnston et al. |
| 6,188,399 | B1 |  | 2/2001 | Voas et al. .................. 345/723 |
| 6,392,671 | B1 |  | 5/2002 | Glaser ........................ 715/765 |
| 6,668,354 | B1 |  | 12/2003 | Chen et al. .................. 715/517 |
| 7,137,066 | B2 |  | 11/2006 | Fernandez et al. |
| 2003/0052921 | A1 |  | 3/2003 | Ulrich et al. ................ 345/765 |
| 2005/0015729 | A1 |  | 1/2005 | Fernandez et al. |

FOREIGN PATENT DOCUMENTS

WO    WO 95/31773    11/1995

* cited by examiner

*Primary Examiner*—Namitha Pillai
(74) *Attorney, Agent, or Firm*—Merchant & Gould PC

(57) ABSTRACT

A binary theme file format provides optimized access to retrieve graphical component theme property data. The binary format includes data structures storing a set of defined visual characteristics for graphical component classes, parts, and states. The data structure includes a hierarchy of theme data. A theme manager quickly retrieves theme property data by indexing into the binary file with a unique theme handle. The theme manager accesses state, part, class, and global property sections to retrieve theme data. Jump tables and jump-to-parent references allow for quickly traversing property data sections. Packed data sections have packed objects having the necessary property data for frequently used graphical components. A custom image region data section provides border data for nontransparent image borders. A sampled colors section facilitates rendering of images with solid sections. The binary file format can be constructed using a text theme file and is loaded into shared process memory.

15 Claims, 17 Drawing Sheets

BINARY CACHE FILE FORMAT FOR THEMEING THE VISUAL APPEARANCE OF A COMPUTER SYSTEM

RELATED APPLICATIONS

This application is a divisional of application Ser. No. 09/827,993 now U.S. Pat. No. 7,137,066, filed Apr. 5, 2001, and is incorporated herein by reference, which claims the benefit of U.S. Provisional Application No. 60/195,607, filed Apr. 6, 2000, and a continuation-in-part application of U.S. patent application No. 09/670,791, filed Sep. 27, 2000 now U.S. Pat. No. 6,873,337, entitled Application Programming Interface For Changing The Visual Style, which claims the benefit of U.S. Provisional Application No. 60/195,593, filed Apr. 6, 2000.

TECHNICAL FIELD

The present invention relates to a computer system and, in particular, to a binary file format that facilitates creating and changing the visual style of displayed graphical components, such as controls.

BACKGROUND OF THE INVENTION

Computer users in both the business and home environment have become accustomed to using a computer with a graphical operating system. For example, many users operate computers having a Microsoft Corporation "WINDOWS" operating system thereon. Certain components of these graphical operating systems are known as "controls." For example, a control may be an "OK" button, which is generally a rectangular button with "OK" written in it. By moving the cursor over the button and clicking on the mouse, a known operation will begin that is associated with the control. Many other controls exist, with examples including scroll bars, dialog boxes and sliders. Beyond controls, the graphical operating systems also draw, or render, other graphical components as needed on the display of the computer, such as the window frame, the minimize box and the close box.

There are two general kinds of controls in WINDOWS: standard and custom. Standard controls are provided by the operating system. The code to create, draw and operate standard controls is contained in the common control library (COMCTL32.dll), or in USER32.dll, both of which are standard libraries provided as a part of WINDOWS. Custom controls are all other controls. Custom controls may be created by the manufacturer of the operating system or by third parties. The code for custom controls is contained in a corresponding separate library (DLL) or within an application.

Currently, when a graphical user interface component, such as a control, is used by an application, the application requests that an instance of the component be created. Following this, the operating system transmits a generic message to the component, instructing the component to render itself. The application plays a role in routing the message from the main window to the targeted control, but the control code performs the drawing. The application uses application programming interfaces (API's) to create and interact with the control. An API serves as a software interface to be used by other programs, much as the keypad serves as an interface to a calculator. An API is a fundamental concept of high-level programming. In high-level programming, a program often does not execute tasks by itself. Instead, the program asks some other program to execute these tasks. For example, programs frequently delegate various tasks to the underlying operating system. Continuing with the above example, an application delegates the rendering of a control to the control's code.

In the prior art environment, when a generic rendering message is received by a control to draw itself, the control will draw itself using its own drawing software code. In this prior art environment, the control knows what it is supposed to look like, how it is supposed to behave, and can effectuate such a display on the user interface of the computer. Thus, the application may delegate all aspects of visual rendering to the controls, avoiding the need to contain software code to support the visual rendering of the control within the host application itself.

By utilizing the standard controls defined and rendered by the operating system, all controls will have the same appearance, regardless of the application. Users of graphical operating systems can change only a limited number of characteristics of the controls. In the "WINDOWS" operating system, a user can change the color scheme used to display the various controls and components on the monitor. The user can also select one of a number of fonts to be used by the controls and components. The user can also specify a limited number of nonclient sizes that will control the sizing of the non-client areas. Thus, the colors, fonts and a limited set of sizes of the controls and components may be changed. However, the basic appearance of the controls and components is dictated by the rendering software code within the control library containing the particular graphical component or control. In the prior art environment, to change the appearance of the controls or graphical components, the rendering software code must be altered. For example, if it is desired to change the appearance of the "OK" button, the rendering software code within the operating system DLL file containing the button control must be altered and the DLL file reconstructed at the binary level. If it were desired to render the button as an oval, the software code would have to be changed accordingly. Such an approach makes it difficult, if not impossible, for a computer user and for software manufacturers, to easily alter the appearance of the controls and graphical components.

In order to enhance the user experience of the computer, it would be desirable for the user to have the ability to change the overall "look and feel" of the graphical display by changing the overall visual appearance or "theme" of the various graphical components. In other words, it would be desirable if the user could change not only the color and font of the graphical components appearing on the monitor, but to change the appearance of those graphical components as well. For example, it would be desirable to be able to alter and direct the layout of the parts of a control, and to define the shape of a control or its parts. It would also be desirable to control all aspects of how a control or its parts are drawn. Because the controls and graphical components existing within the DLL file in the prior art environment are "hard coded" with their own rendering software code, it is difficult and cumbersome to change the appearance of all of the controls and components. To do so would require recoding each of the controls to achieve the desired appearance. If multiple visual styles were required, they would each have to be predefined and each "hard coded" into every control.

Using the current approach, if a user interface designer desires to have a new "look" for a set of graphical components, the designer typically communicates this desire to a programmer. The programmer will then attempt to appropriately code the components to achieve the look desired by the designer. The designer will then review the look and communicate any needed changes to the programmer. This process continues, often with multiple iterations, until the designer is satisfied with the look achieved. It can be seen that the above process is time consuming and is limited by the communication between the designer and the programmer. It would be desirable to allow the designer to be able to perform the tasks necessary to achieve a specific look and to be able to revise the look achieved until the designer is satisfied. This would eliminate the revision time between the designer and the programmer and would give the designer more flexibility in the look achieved.

Certain prior art approaches exist that attempt to address the above situation. However, these solutions do not allow all of the controls and graphical components of the entire system to be changed. Instead, the prior art approaches address only limited portions of the set of displayed components. This allows the appearance of some controls and graphical components to be altered, leaving the remainder unaltered. Such an approach leaves an appearance that is not as coordinated as may be desired.

The prior art approaches are further limited by the techniques they employ to implement control of the appearance characteristics of visual elements of the graphical user interface. Prior art appearance modifiers operate by intercepting the generic rendering signals transmitted to the control, and, using low-level operating system graphical APIs, substitute their own rendering code for that of the control. However, only a portion of the visual elements in the graphical user interface is interceptible. Because the prior art approaches depend exclusively on the interception of operating system signals, not only are they themselves incapable of controlling the appearance of visual elements that do not function according to this protocol, they are incapable of providing a standard means for the author of the visual element to modify the rendering code to accommodate external control.

Further, it is not possible to intercept all relevant signals transmitted by the operating system to a control in the course of rendering. Still further, it is not always possible to reproduce complex visual behavior implemented by a control, such as animated sequences. Thus, the prior art approaches are prone to functional incompatibilities, visual flaws, and performance problems.

Further, prior art approaches do not allow the file that describes how to modify the appearance of the graphical components to be extensible. In other words, only certain components can be changed and this limited set of components cannot be expanded by the designer. Such an approach leaves an appearance that is not as coordinated as may be desired, and does not offer the needed flexibility to the designer. Still further, prior art approaches do not offer the user multiple choices within a selected visual appearance or theme.

Furthermore, the speed of property retrieval in prior art approaches is suboptimal. Prior art approaches store properties in text files that require the time-consuming process of parsing during run time to retrieve the property data. Prior art approaches do not provide direct access to properties with fixed structures for standard controls that are frequently accessed. An additional problem with existing systems is they do not provide a method for rapidly indexing to the desired property data using binary operations. Still further, prior art approaches have no special optimization for images that contain solid colors as one or more of the 9-grids of the image or multiple solid color lines as borders. Typically, solid colors can be drawn much faster than bitmap images.

SUMMARY OF THE INVENTION

In accordance with the present invention, the above and other problems are solved by creating a theme file in a binary format for fast and efficient access to retrieve graphical component theme property data. The binary format includes a control name table object representative of the controls names within the schema file and providing a link to each control's property data. The property data for a control include a hierarchal property list which contains part and state jump tables and a property value data structure for each property defined in the authored classdata (text) file. Together, these property value data structures define the visual characteristics for all parts of the control (including every state of each part).

In accordance with other aspects of the present invention, included is a system that converts a non-binary format theme file into a binary format theme file and loads the binary format file into shared memory when the user selects a new theme. The newly loaded theme is available to processes for later rendering of graphical components.

In accordance with other aspects, the present invention relates to a method of retrieving theme property data from the binary format file when requested by a graphical component. The method includes searching a state properties table and retrieving any property data that is found there. A subsequent jump to the part property table enables the retrieving of any property data that is found there. After another jump to a more generic class property table, property data stored there is retrieved. This is followed by a final jump to the global property section and retrieving the most generic property data.

The invention also includes packed drawing objects that are the minimum set of property structures needed to represent each class, part, and state in the theme file. Also included is a custom region data section having points with horizontal and vertical offset values that define the borders of nontransparent regions of an image. Also included is a sampled colors section having samples of colors to facilitate resizing images with solid borders and interior regions. The invention also includes a text objects section having the minimum set of properties needed to represent each graphical text component.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The great utility of the invention is that theme properties are quickly and efficiently retrieved. Also, changes to themes do not necessitate changes to component rendering code, so that many themes can be developed and easily implemented.

These and various other features as well as advantages, which characterize the present invention, will be apparent from a reading of the following detailed description and a review of the associated drawings.

DETAILED DESCRIPTION OF THE INVENTION

The present invention provides a system, method and file format that facilitates creating and changing the visual style of displayed graphical components, such as controls, within a graphical operating environment. In one embodiment of the present invention illustrated in FIG. 1, operating system 134 is a graphical operating system having graphically displayed controls and components associated therewith. Controls include, but are not limited to, such things as scroll bars, push buttons and sliders. Other controls are within the scope of this invention, and are known to those of skill in the arL Other graphically displayed components are also within the scope of this invention. These components include, but are in no way limited to, non-client sections of the windows in the display, such as the frame surrounding an application display on the user interface, the minimize box, and the close box.

Figure 1:
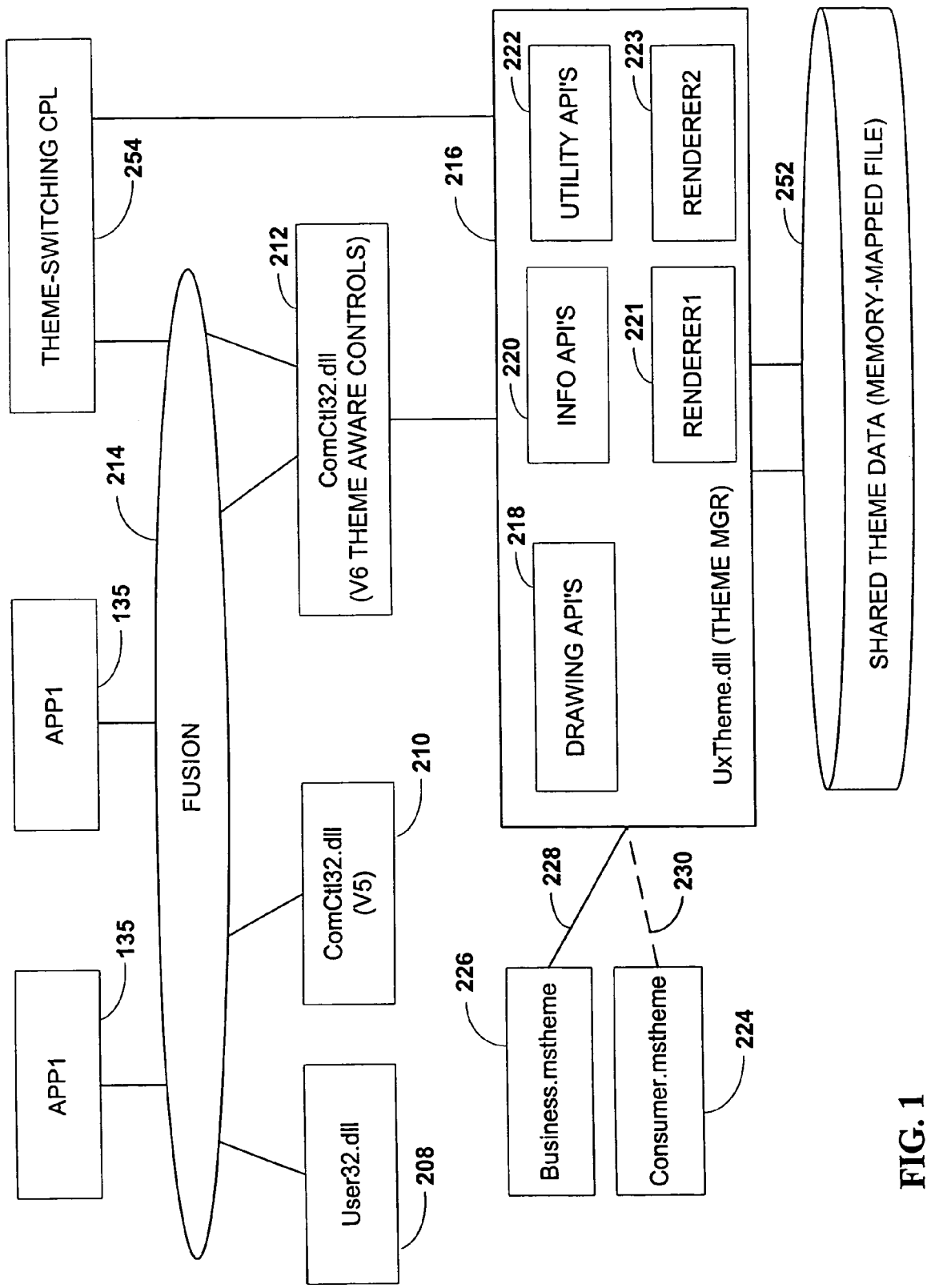
FIG. 1 is a schematic diagram illustrating the architecture used in the present invention.

In FIG. 1, the basic architecture used in this embodiment of the present invention is illustrated. If the reader is already familiar with the operations of the theming system due to familiarity with the related patent application identified above, then it is suggested that the reader proceed to the description of FIGS. 9(a)-(d), 10, and 11 to understand embodiments of the present invention related to a binary file format for theming system components. The architecture is illustrated with example applications 135 that are open and running on the computer 110. As an application 135 is running it often requires a control or graphical component to be rendered, or displayed, on the monitor 191 of the computer 110.

In FIG. 1, libraries 208, 210 and 212 are linked to the applications 135 through a fusion module 214. Fusion module 214 enables the theming of controls in applications without needing to change the applications themselves to request the themeable version of the controls. Fusion module 214 enables each application 135 to load the specific version of the DLL 208, 210 or 212 at run time through the use of a manifest. The fusion manifest specifies the environment in which an application will run, which allows multiples versions of a DLL to exist on one machine. Thus, fusion module 214 will map the request for a component so that it is rendered as a themeable element in DLL 212 instead of a non-themeable element from DLL 208 or 210. This allows an existing application to be themed without changing code of the application. Fusion module 214 also allows the new themeable controls to be placed in a different DLL from the existing DLL, which simplifies implementation and minimizes compatibility risks.

Shared theme data 252 is a binary theme file containing all graphical component theme property data. Shared theme data 252 is created from several text files. The information from the text files is serialized into a binary theme file to allow for rapid run-time retrieval of property data. When an application 135 is started and dynamic link libraries are linked into its memory map, shared theme data is linked into the memory map. Theme manager 216 indexes shared theme data 252 using a handle from application APP1 135 and component information. Shared theme data 252 is built with hierarchical levels of component data. The format of shared theme data 252 will be discussed in more detail with reference to FIGS. 9(a)-(d).

Application 135 is notified by theme manager 216 when new binary theme file is loaded into shared theme data 252. A new binary theme file is loaded into shared theme data 252 when the computer user selects a new theme, such as "Business.msstyles" 226. In response to notification of a new theme, each control in an application such as APP1 135, makes a request for a new theme handle, which is a theme handle used for later access into shared thane data 252. Theme manager 216 will return a handle to the requesting control if matching theme data is found for the application and control in the shared theme data 252. If theme data specific to the requesting application and its control is not found, a match for the control itself will be searched for. If successful, a theme handle for will be returned in response to the request. For subsequent component rendering, the theme handle is passed to the theme manager as a parameter, allowing the theme manager 216 to rapidly locate theme property data in shared theme data 252. The process of shared theme data update will be discussed in more detail in reference to FIG. 11.

Figure 2:
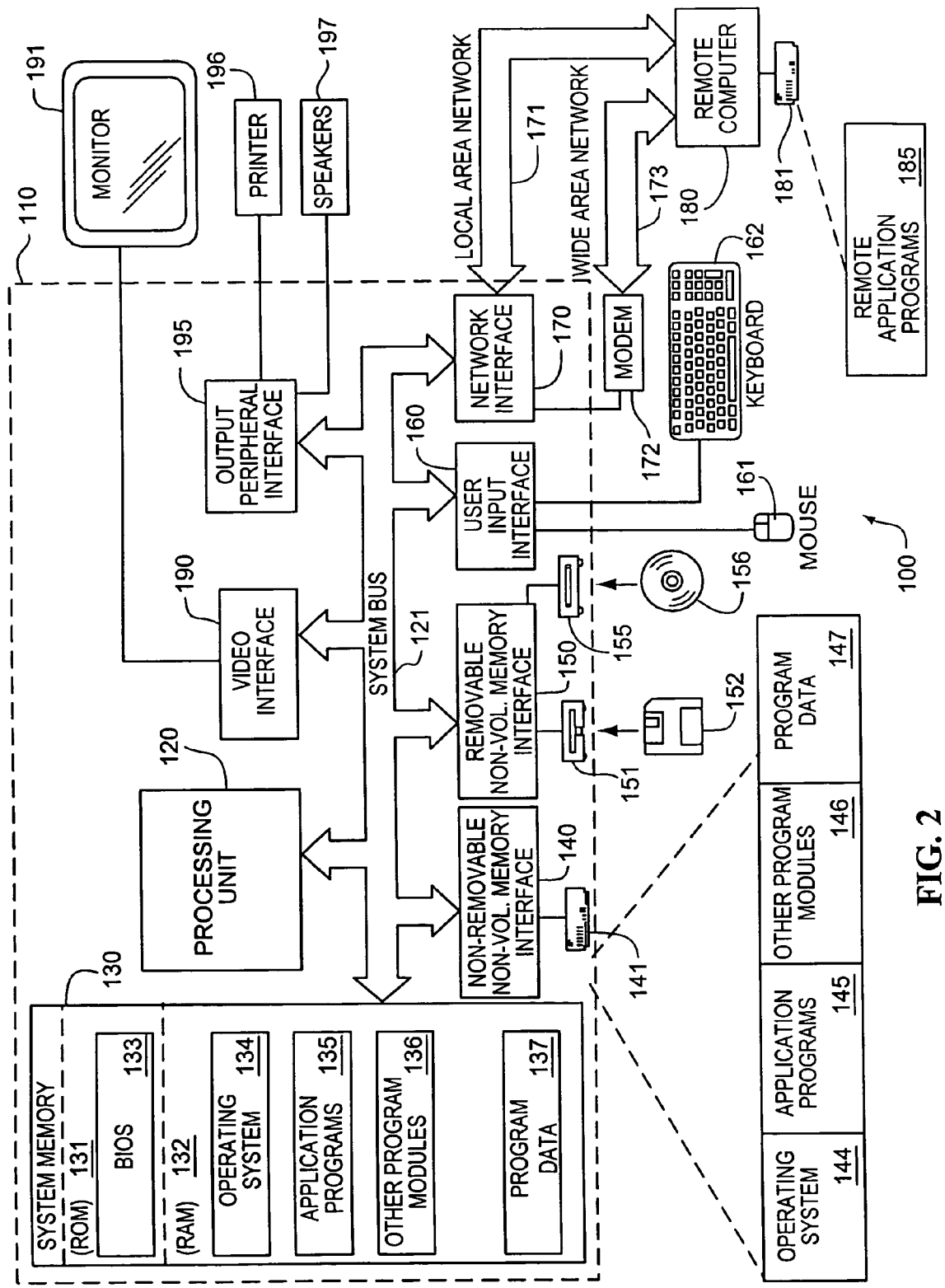
FIG. 2 illustrates a suitable computing system environment for use in implementing the present invention.
Figure 3:
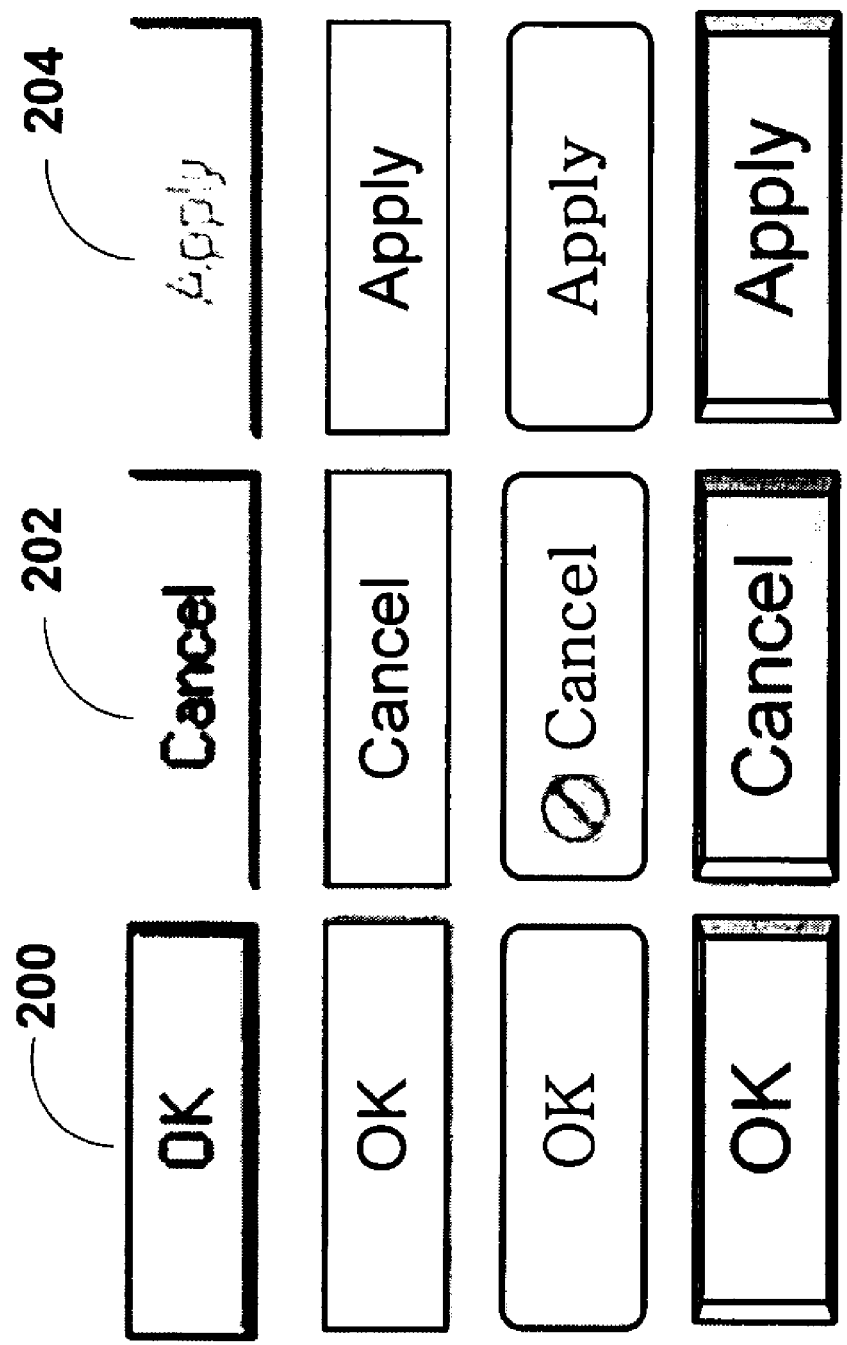
FIG. 3 is a representation of examples of graphical components having different themed appearances.

An example display of graphical components having a variety of appearances is seen in FIG. 3. As shown in FIG. 3, the controls may take the form of an OK button 200, a Cancel button 202 and an Apply button 204. The present invention allows the appearance of the controls and other components to be visually changed to better suit the desire of the computer user. The invention allows the appearance of the controls to be altered beyond color and font selection. For example, the layout of the parts of a control can be defined as desired. For example, a scroll bar could be rendered with the up and down arrow buttons adjacent to each other at the bottom of the scroll bar, instead of the up arrow and the top and the down arrow at the bottom. Further, the shape of the control and its parts may be defined. As shown in FIG. 2, four different overall appearances are shown for each of the buttons 200, 202 and 204. Each different appearance setting is coordinated and is called a "theme." Each theme is represented by one of the rows of buttons in FIG. 3. While only four themes are shown in FIG. 3, an unlimited variety of themes may be created for selection by the computer user. The theme is a collection or set of appearance characteristics relating to a particular subject or desired visual environment. As described below, the present invention allows the user of the computer to specify which of a number of predefined themes is to be applied to the controls and other components of the visual display. Moreover, the present invention allows new visual themes to be added to the system without the need of changing the software code of the controls and other graphical components. Still further, the present invention allows addition of new rendering technologies or modification of existing rendering technologies without changing the software code of the controls and other graphical components.

As an application 135 is running it often requires a control or graphical component to be rendered, or displayed, on the monitor 191 of the computer 110. For example, with reference to FIG. 3, the display of an OK button 200 may be needed by the application on the monitor. Application 135 requests that an instance of button 200 be created. Following this, the operating system transmits a generic message to the control instructing it to draw itself. This request would be routed to the dynamic link library (DLL) that contained the particular control. As an example, the DLL in the WINDOWS operating environment would be called User32.dll or ComCtl32.dll(V5), shown as 208 and 210, respectively, in FIG. 1. Libraries 208 and 210 exist within graphical operating system 134. Libraries 208 and 210 are linked through fusion module 214 with applications 135. The defined control within libraries 208 and 210 contains the drawing code needed to render the control on the monitor. Therefore, to change the appearance of controls in libraries 208, and 210, the software drawing code must be changed for each control within libraries 208 and 210.

An additional library DLL, shown as 212 in FIG. 1 similar to library 210, in that it contains a number of predefined controls and graphical components that may be used by application 135. Broadly, DLL 212 contains a number of components that are to be graphically displayed. In library 212, however, the controls are defined differently, making them "theme aware." Rather than containing all of the software code needed to render the control, the controls are defined with certain basic information or values about the control, for example, the location, parts and states of the controls.

The location is the position on the user interface where the control is desired. Parts are the different items that make up the control. For example, a scrollbar control has an elongated rectangular shaft part, a smaller thumb part that slides within the shaft part, and an arrow part at each end of the shaft part. The state of a control describes the current appearance and functional state. For example, a button can be active, pressed, hot (when the mouse is over the control), disabled or inactive.

The controls within DLL 212 also contain the drawing code needed to render the controls if no themes are selected, as well as the theme-aware paths through the code. DLL 212 requests rendering or drawing services from a theme manager DLL 216. Theme manager 216 provides the requested rendering services and draws the control on the display at the indicated location, with the indicated parts in the indicated states.

Theme manager 216 contains a series of APIs that allow library 212 to interact and communicate with the theme manager. The APIs allow a control author to define a control within DLL 212 as a series of parts and states without the need for software rendering code.

These APIs are generally divided into three types: drawing APIs 218, information APIs 220 and utility APIs 222. Drawing APIs 218 are generally used to render and assist in the layout of the needed control parts and other components. Information APIs 220 are generally used to obtain information about the current defined appearance of the controls to allow controls to be individually customized. Utility APIs 222 are those APIs used by parts of the operating system other than the controls, to control theme selection. Utility APIs 222 include functions that can be used to enumerate available themes and load one of them.

Drawing APIs 218 are a collection of theme-aware drawing services. Each individual API within the set of drawing APIs 218 is used to perform a different drawing service. Generally, each API requires a specified part and state of the graphical component at hand. An API called "DrawThemeBackground" is provided that draws the theme-specified border and fill for the specified part and state at the desired location. Similarly, an API called "DrawThemeText" is provided that draws the specified text using the themo-specified color and font for the specified part and state.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 144 is loaded in RAM 132, the processing unit 120 executes the operating system code and causes the visual elements associated with the user interface of the operating system 134 to be displayed on the monitor 191. When a user opens an application program 135, the program code and relevant data are read from the hard disk drive 141 and stored in RAM 192.

Figure 4:
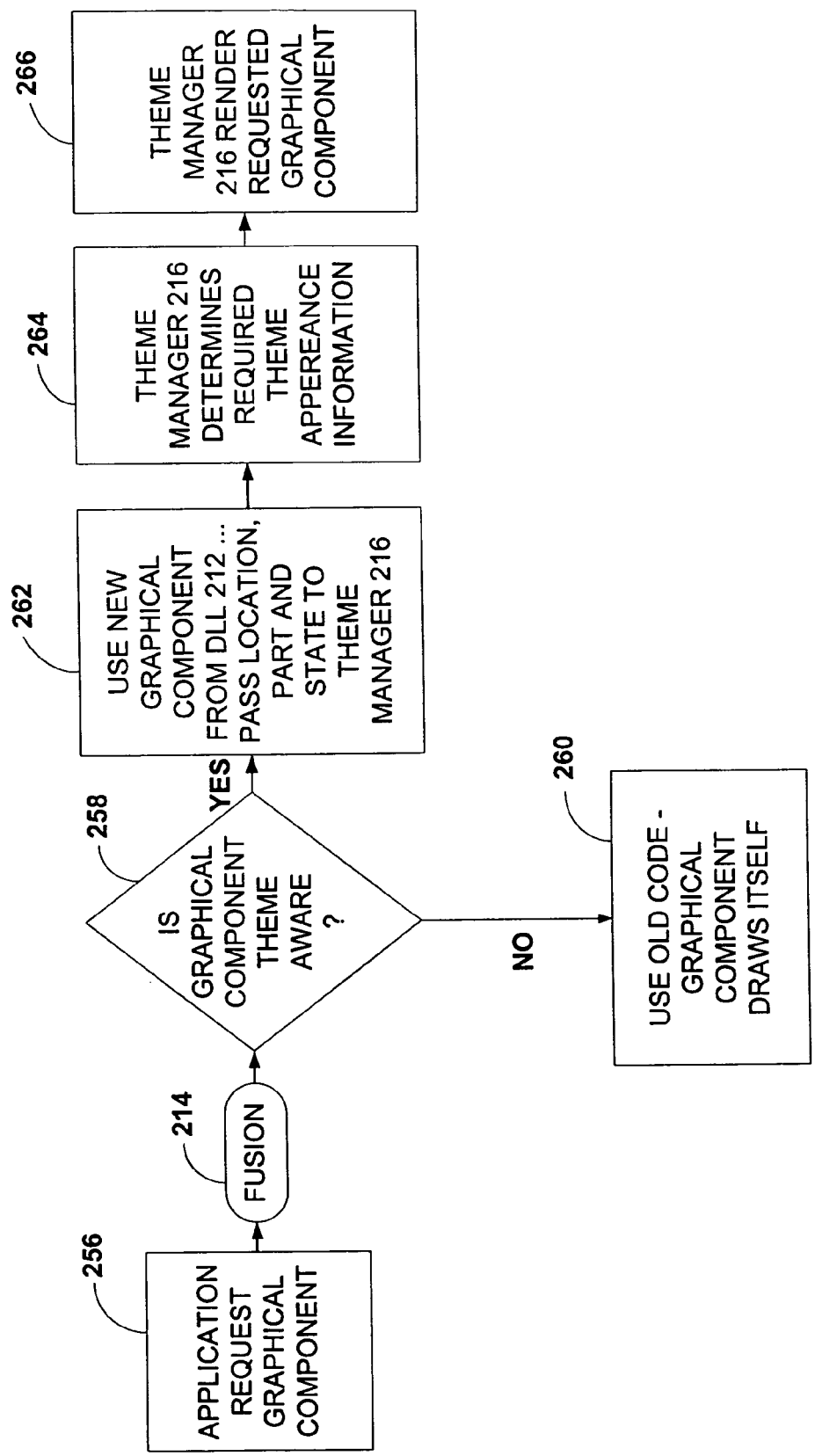
FIG. 4 is a flow chart illustrating use of the present invention by an application in requesting a graphical component.

In operation, as is best seen in FIG. 4, an application 138 or 139 will request a graphic, such as a control, to be rendered on the user interface, as represented at 256. This graphical request is routed through fusion 214. As represented by 258, the fusion process will determine if the requested control is a theme-aware control. If the control requested is not theme-aware, the old code is used and the control will draw itself using a control from DLL 208 or 210, as represented by 260 in FIG. 4. If the control is theme aware, the graphical request is processed in DLL 212, as is represented by 262. The controls within DLL 212 will pass basic information for the graphical request, such as the part, state and location for the requested control to the theme manager 216 in a request for rendering services, using APIs 218, 220 and 222. Thus, the graphical request is processed in DLL 212 without application of the appearance characteristics that are found by theme manager 216. Theme manager 216 will then determine or apply the theme-specific appearance characteristics for the given control part and state, as shown by 264. This appearance data is retrieved from the shared memory map data file 252. Using the retrieved appearance data, for the requested control part and state, along with the location, the theme manager will render the control on the display of the computer, as represented by 266.

Figure 5:
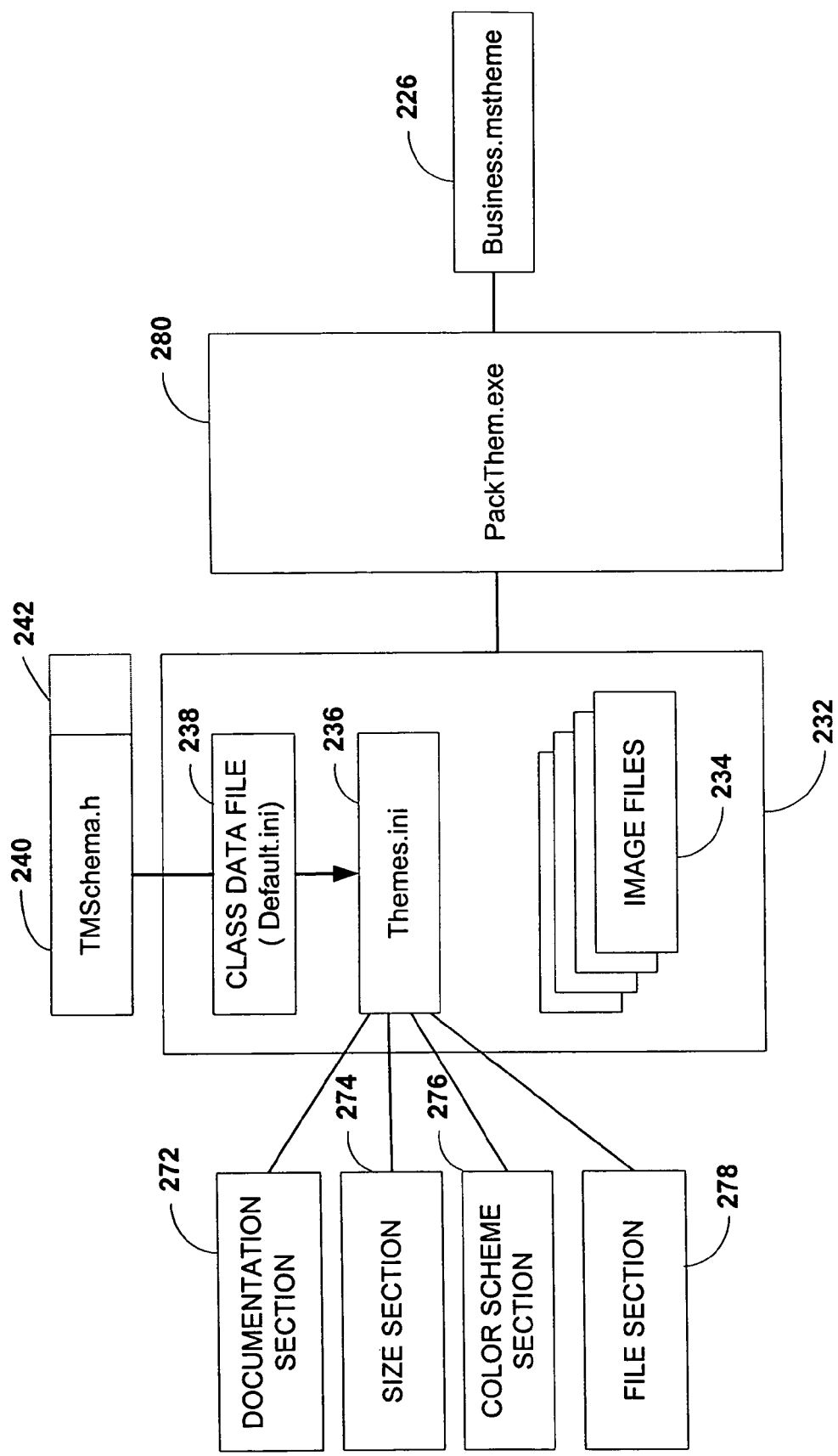
FIG. 5 is a schematic diagram illustrating the architecture of a theme file.

Each theme 224 and 226 has similar architecture. As seen in FIG. 5, a theme directory 232 is included with business theme 226. Directory 232 includes a series of image files 234. Image files 234 are the image files that will be used by the particular theme. In this case, image files 234 are the image files that will be used by business theme 226. Business theme 226 also includes a themes.ini file 236. File 236 is a text file and can be created in either ANSI or UNICODE character sets. File 236 specifies the available color schemes and sizes available for the theme. In the case of theme 226, file 236 specifies the available color schemes and sizes available for business theme 226. File 236 therefore represents all of the variations of the theme to which it applies, as is more fully described below.

File 236 is a directory of available class data files 238. In other words, the class data files 238 are packaged into file 236, as is described below. Class data files 238 are also .ini files as shown by the label "Default.ini." Class data files are used to list the theme data for a specific size and color. Each class data file is created by the theme author or designer from a schema file 240, labeled TMSchema.h in FIG. 5. Schema file 240 defines the controls, parts, states and available properties. Schema file 240 defines the properties that are recognized by the theme manager and gives them a unique identifier so they can be shared between the theme manager 216 and the control code at runtime. Schema file 240 is thus the defining vocabulary of available options that may be placed in a class data file 238. However, file 240 is extensible, as represented by the added material 242 in FIG. 5. Therefore, if a theme author creates a custom control with custom properties that are not within file 240, the theme author may create a mini-schema file 242, and register it, which may then be used to create a class data file 238. Schema file 240 typically resides within theme manager 216.

As an example of the type of information within schema file 240, information about the button control may be present. For example, the following may be contained within the schema file 240:

"Button" parts and states:
Pushbutton=Up, Pushed, Disabled, Hot, Default
Radiobutton=Unchecked(1), Checked, UncheckedDown, CheckedDown
CheckBox=Unchecked(1), Checked, UncheckedDown, CheckedDown
GroupBox
UserButton.

This information informs the theme author of the available controls and the defined parts and states for those controls. This information, along with available properties for the controls, parts and states, informs the theme author as to what is available for composing class data file 238. If a custom control is created, it may be placed in the mini-schema file 242. The flexibility provided by the mini-schema file allows a designer or theme author to add to schema file 240 and the created class data files 238. Thus, schema file 240 and any mini-schema files 242 are basically master definition files that allow the theme author to create a defined theme appearance.

Figure 6:
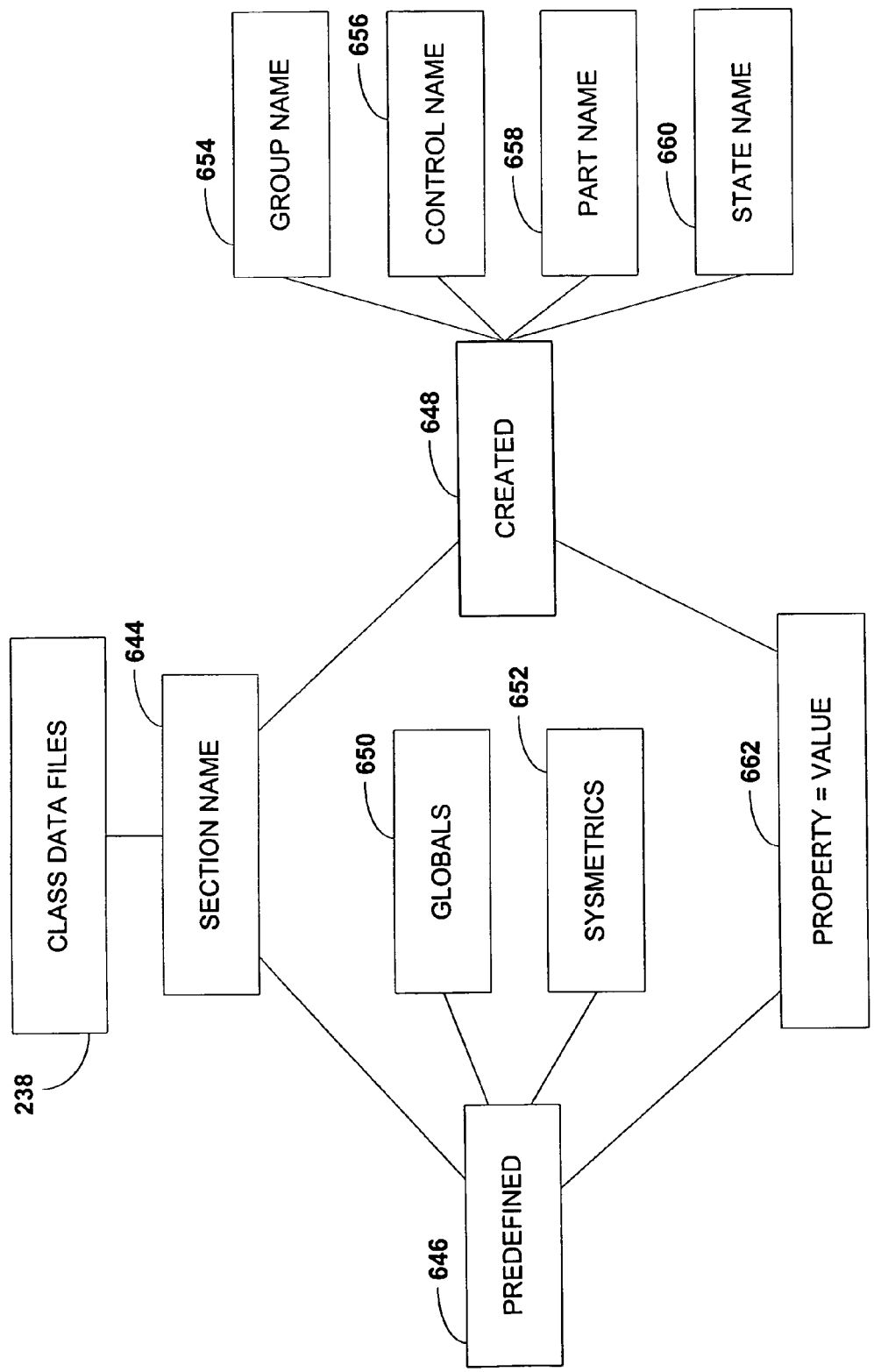
FIG. 6 is a schematic diagram illustrating the architecture of a class data file.

As best seen in FIG. 6 each class data file 238 has a specific file format that allows each class data file 238 to be easily and uniformly created. File 238 may contain defining sections 644, which may be either predefined sections 646 or created sections 648. Typical predefined sections 646 include a globals section 650 that is a list of property name settings that are inherited by each parent class section. If used, the globals section 650 must be the first section. The globals values will be overridden by more specific, created properties if they are present, as is more fully described below.

Another predefined section that may be specified is called "Sysmetrics," and is labeled 652 in FIG. 6. Sysmetrics section 652 allows the theme author to set the system metrics when the theme is loaded so that the look of non-themed applications can be made to more closely match the look of the theme. The Sysmetrics section 652 is therefore available to legacy applications that are not "theme aware." When a theme is created, the theme author can set system metrics values to appear as close to the theme as possible. System metrics such as the colors for controls and non-client components, fonts, sizes, booleans and strings can be set using the Sysmetrics sections 652.

Created sections 648 are also referred to as class sections. Each class section can have an optional group name 654, a control name 656, an optional part name 658 and an optional state name 660. The group name 654 is the base name of an application, such as "MICROSOFT MONEY." If the group name is specified, then the properties specified will be applied only to that application. The control name 656 is simply the class name as defined by the control author. For example, the control name might be "button." The part name 658 is the child part name. For example, a part name for a button might be "pushbutton." The child part name 658 must be defined as a part name for the control name 656 in the TMSchema.h file 240. Finally, the state name 660 is the state that the part might be in. For example, a state name 660 for the pushbutton part might be "up." The state name 660 must be defined as a state name for its part 658 in the TMSchema.h file 240. In order to logically separate each of the above, the group name 654 is followed by ::, a period is placed between the control name 656 and the part name 658 and the state is placed in parentheses. As an example, a theme author may specify [MICROSOFT MONEY::button.pushbutton(up)]. The properties defined using this specification would apply only to the up state of the pushbutton part of the button in MICROSOFT MONEY applications. For both the predefined sections 646 and the created sections 648 properties are specified along with a corresponding value, as indicated at 662 in FIG. 6. The following table represents the basic property types and the corresponding value formats:

| PROPERTY TYPE | VALUE FORMAT |
| --- | --- |
| String | Any text to the right of the "=" with no quotes. |
| Int | A signed integer or hex number |
| Bool | On of the values: "true" or "false." |
| Color | A comma separated list of three numbers, corresponding to red, green and blue. |
| Enum | A string value that gets matched to a declared enum. |
| Margins | A comma separated list of four integers, with partnames "lw", "rw", "th" and "bh". |
| Filename | A relative path that gets fully qualified. |
| Size | An integer followed by optional "twips," "pixels," or "points." |
| Position | A comma separated list of two integers with partnames "x" and "y." |
| Rect | A comma separated list of four integers with partnames "l", "t", "r", and "b". |
| Font | Family name, size and font flags. |

Figure 7:
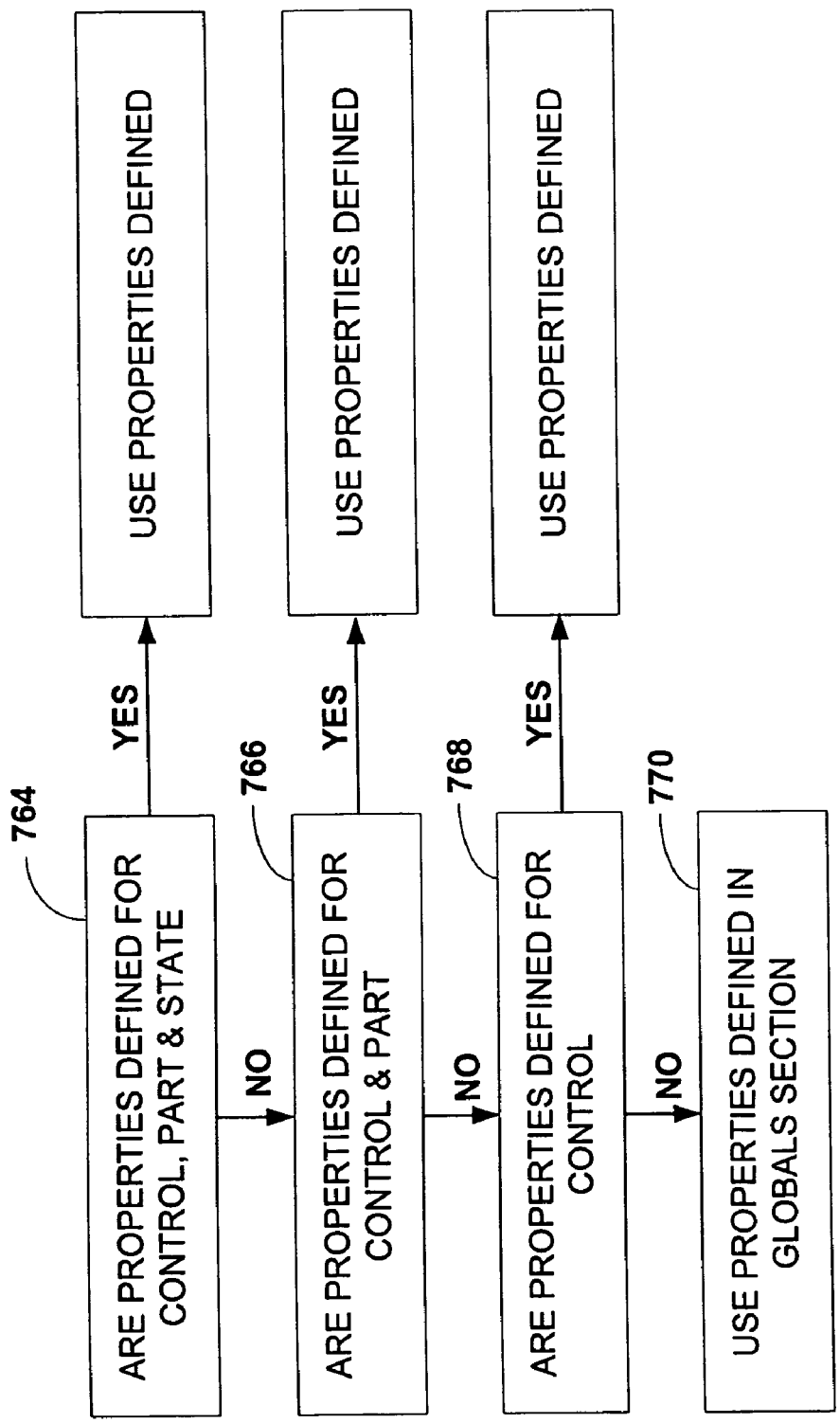
FIG. 7 is a flow chart illustrating the hierarchy in using the properties in the class data file.

Each of the group name, control name, part name and state name behave in a hierarchical fashion. State names 660 inherit from their part name 658 or control name 656 and part names 658 inherit from their control names 656. The group name 654, control name 656, part name 658 and state name 660 contain, together with the inherited globals section 650, all of the property values needed to render the specified class of control. This hierarchy can best be seen in FIG. 7. As indicated at 764, it is first determined if properties are defined for the control, part and state. If so, they will be used. Similarly, it is next determined if properties are defined for the control and part, as indicated at 766. If so, the defined properties will be used. If not, it is then determined whether properties are defined for the control, as shown at 768. If so, the defined properties will be used. If not, the properties defined in the globals section 650 will be used, as indicated at 770.

The above file format for the class data files 238, along with the available vocabulary as defined in the schema file 240 can be used by the theme author to create a variety of class data files 238 without the need to go through a series of iterations with a programmer. As an example, a theme author may draft the following:

[Button]
   Font=Arial, 14, Bold
   ImageFile=bluebutton.bmp
[Button.Pushbutton]
   TextColor=255, 0, 0
   Font=Arial, 15

In this example, the properties defined for all buttons are "font" and "ImageFile". The pushbutton part of the button overrides the "font" property with its own value, adds a new "TextColor" property, and inherits the "ImageFile" property from button. The defined properties for the button class will be applied to all buttons, but the specified properties for the pushbutton part will prevail over the specified properties for the button class.

Theme file 236, the "package" file, also consists of one or more sections. The sections within theme file 236 include a documentation section 272, a size section 274, a color scheme section 276 and a file section 278. Documentation section 272 is optional and may contain any property name. For example, documentation section may specify a name for the theme to be displayed on the user interface, such as "business theme."

Size section 274 specifies the size names available, such as "default size," "very small" or "very large."

Color scheme section 276 is used to specify a simple color scheme name and an optional color scheme transformation associated with the color scheme name. For example, if only one color scheme is available, the color scheme name would likely be "default color." Other color scheme names could be made available, as described below, and would be named as well. For example, a blue color scheme and a red color scheme could be listed in color scheme section. If a particular desired color scheme has not been created as a class data file, as more fully described below, the theme author can perform a color scheme transformation on an existing theme file. In the color scheme section, the theme author can transform an existing color scheme through use of "From Color=" and "To Color=" commands along with available "From Hue=" and "To Hue=" commands. The values specified after the "=" sign are values for red, green and blue, respectively. For example, if the theme author desired to change any color that is red to green and to change the hue of the color scheme, the theme author may specify in the color scheme section 276:

From Color1=255 0 0
   To Color1=0 255 0
   From Hue=128
   To Hue=75.

A number of these transformations are supported, and preferably five such transformations are supported. These color transformations operate on explicit color values within the class file being transformed, as well as on the image files specified in the class file. This transformation process allows the theme author to generate a large number of available colors from a single class data file.

The size section 274 can operate similarly to color scheme section 276 as described above. As such, a size name can be associated with a specific class data file. Additionally, size transformations can be performed on a specified class data file in a manner like that described above for the color transformations.

File section 278 is used to specify a unique name for each of the class data files 238. Each class data file listed in the file section 278 will include the file name, a color scheme (from color scheme section 276, including transformations) for that file name, and the sizes (from the size section 274) that the file will support. File section 278 is therefore a list of all possible colors and sizes available, including color transformations. The file section 278 is named "file.xxx" where "xxx" is replaced with a unique name for the class data file. The file section 278 recognizes properties for a filename, color schemes and sizes. An example file section for the class data file named "One" would be:

[File.One]
   Filename=Large.ini
   Colorschemes=default, blue, red
   Sizes=Large In this example, file section 278 corresponds to the Large class data file and supports the color schemes default, blue and red. The only size that the file supports is "Large."

Image files 234 and theme file 236 (including packaged class data files 238) are broadly grouped together to make up theme directory 232. Theme directory 232 and the schema file 240, along with any mini-schemas 242, are used to build the business theme file 226. Theme directory 232 thus contains a theme.ini file 236, one or more class data files 238 and all of the image files 232 used by the theme. The contents of theme directory 232 can be packaged into a DLL file by packthem tool 280. Packthem tool 280 processes the Themes.ini file 236 by parsing it against the schema file 240 for syntax errors and adding the .ini file to the package being built. Recognized properties from documentation section 272 are written to a package string table. Color scheme information from color scheme section 276 and size information from size section 274 is also written to a package string table. Each class data file 238 is also processed. As the class data file is processed, the file is parsed against the schema file 240 for syntax errors. Each class data file is also added to the package being built.

The DLL file produced by packthem tool 280 is business theme file 226. File 226 contains the theme data and this theme data is isolated from control library 212. This allows different themes to be created and selected without changing the controls defined within library 212. Thus, control authors can create and define controls independently of the appearance or theme data. File 226 is in binary format and is passed into a shared theme data file 252 when business theme 226 is selected by the computer user, as best seen in FIG. 1. File 252 is a shared memory map file that can be accessed by all processes. Thus, when a theme is selected by the computer user, theme manager 216 will read the information for a defined theme file, such as file 226, and will place that information in a binary format in file 252 where all running processes have access to the binary information.

Figure 8:
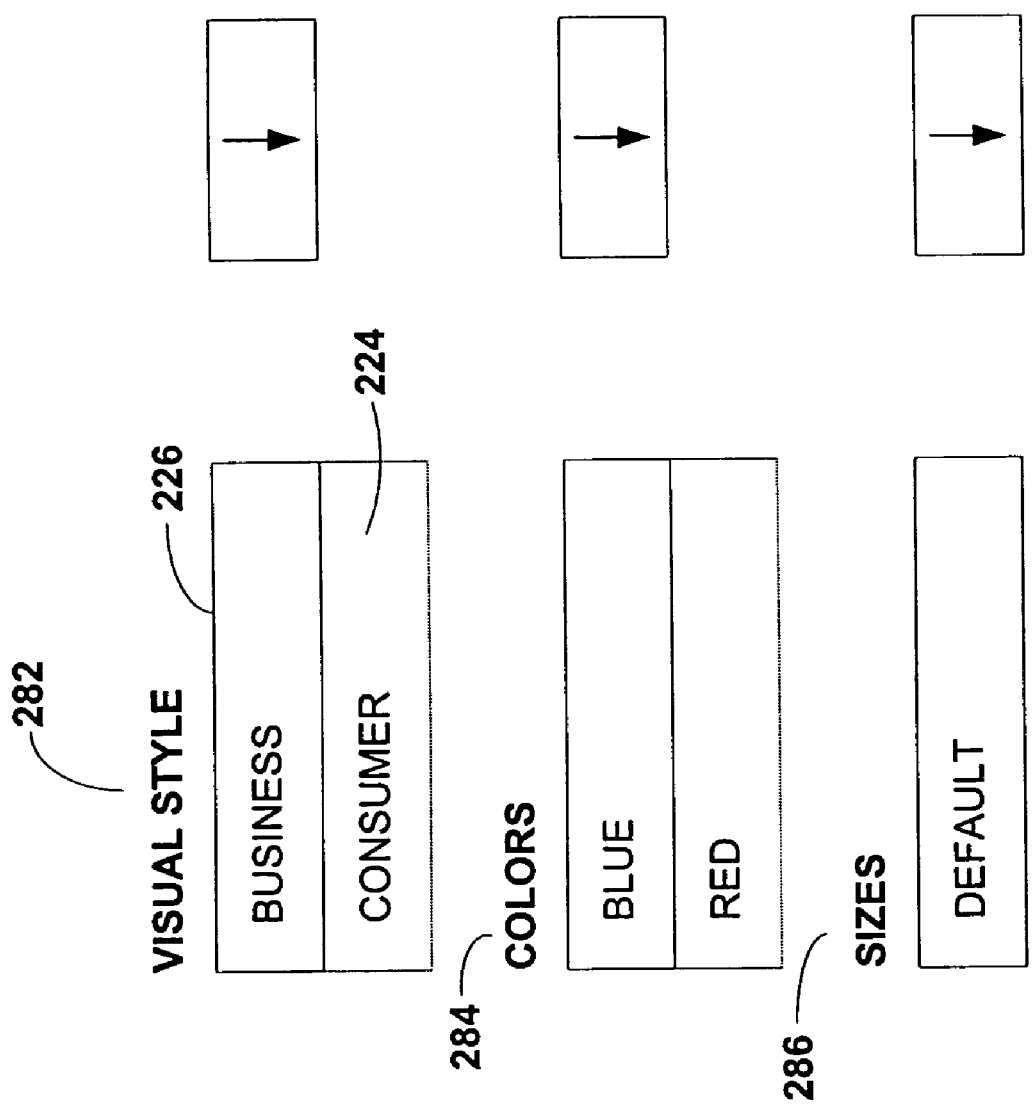
FIG. 8 is a schematic view of a user interface having drop-down menus.

As best seen in FIG. 1, a theme-switching control panel 288 is provided that is in communication with theme manager 216. Panel 288 cooperates with a user interface that displays the available themes from which the user can select. As shown in FIG. 1, control panel 288 would allow a user to select business theme 226 or consumer theme 224. The user would also be presented with available options created by the theme author within each of the class data files. For example, as is best seen in FIG. 8, the user interface may present a series of drop down menus corresponding to the visual style 282, the available color scheme 284 for that visual style and the available sizes 286 for that visual style. In the example seen in FIG. 8, the user can see that the business theme 226 is selected, but that consumer style 224 is available. For the selected business theme 226, the user can see that the theme author has created two color schemes, displayed as "BLUE" and "RED." Finally, the user can see that the only size the theme author has made available is the default size.

If as has been discussed above, business theme 226 is selected and the user of the computer switches to select consumer theme 224, theme 224 will be loaded into shared memory map file 252 as binary data. Theme manager 216 also sends a message to each themeaware control within DLL file 212 that the theme has changed. Each themoaware control knows how to respond to this message.

FIG. 9(*a*) illustrates an embodiment of the binary file format of the present invention. FIG. 9(*a*) illustrates a binary file format that contains all the graphical component property data. The term binary file format refers to a file whose data requires no conversion for the computer to use the data. In contrast, an ASCII text file contains strings of data, such as textual comments, spaces, and line feeds, readable by humans, but not usable in that form by the computer. The computer must first parse the file to get the data into a format that the computer can utilize. Parsing is well-known in the art. The binary file of FIG. 9(*a*) comprises data immediately usable by the computer and requires no extra steps. The binary file of FIG. 9(*a*) can be derived by parsing and streaming the data in class data file 238 of an ".msstyles" file. In the streamed binary form themes can be accessed quickly and efficiently.

In FIG. 9(*a*) a binary file format 902 is shown having a header section 904, class index section 906, global class section 908, system metrics class section 910, and other class sections 912. A class section is shown as having a hierarchical theme data section 916 and a packed objects section 918. The hierarchical theme data section 916 is shown having a part jump table 920, a class property data section 922, a part property data section 924, state jump tables 926, a state property data section 928, and a jump-to-parent data section 930. Furthermore, as will be discussed below, the hierarchically arranged sections allow for rapid indexing and retrieval of theme property data.

In the embodiment of FIG. 9(*a*), the header section 904 typically contains general data describing the theme version number, checksum, total file length, and offsets to the various sections of the file. Class index section 906 contains a list of the applications and classes(i.e., graphical component) and an offset to their associated class sections. The class index 906 contains entries for each class defined in the class data file 238. Each of these entries contains a single class name. Some entries are specific to an application. Any entry that is specific to an application contains an application name as well as a class name. Two special class sections are the global section 908 and the system metrics section 910. The global section 908 contains global property data for components, generically. As will be discussed, global properties are retrieved if there are no specific properties found in another section of the theme data section 916. System Metrics section 910 contains a single property value data structure consisting of a fixed size embedded data structure containing all of the system metric values. The system metrics section will be discussed in more detail later in the discussion of FIG. 12. The other class section 912 contains theme property data for control classes applicable to all applications as well as some application-specific control class sections. The class data section 914 is describes the composition of each class section. The packed object section 918 contains commonly accessed property data grouped together for each control/part/state where they are defined, and will be discussed in more detail with reference to FIG. 9(*b*).

The hierarchical theme data section 916 contains control properties in a set of data sections arranged in a hierarchy. Part jump table 920 contains an offset to the part property data section 924 or an offset into state jump table 926. A special entry in the part jump table 920 contains an offset to the packed objects 918 (for all parts and states of the class), which will be discussed in reference to FIG. 9(*b*). State jump table 926 contains an offset to each state's property data section 928 wherein property data for the part and state are stored. Class property data 922 contains theme property data items for properties defined at the class level. Class property data 922, part property data 924, and state property data 928 contain items that are instances of a property data item 931, shown in FIG. 9(*b*). The lowest level in the hierarchy is the state property data section 928. The next highest level is the part property section 924. The class property section 922 is one level higher than the part property section 924. The global section 908 is the highest level in the hierarchy. A jump-to-parent data section 930 provide an offset into a higher level, or parent, property section. For example, at the end of the state property section 928, the jump-to-parent data section 930 can provide an offset into the part property data 924.

A jump-to-parent data section 930 can be placed at the end of the state property data section 928, part property data section 922, and class property data section 924. For example, after the last property data item 931 in the part property data 924 there can be a jump-to-parent reference 930 that refers to an offset to an entry in the class property data section 922. The class level properties describe the component more generically. Similarly, at the end of a list of class property data items 931 in the class property data section 922 there can be a jump-to-parent reference 930 that refers to an associated entry in the global class section 908. Jump-to-parent references 930 are used to traverse the hierarchy of property sections to gather common property data to build packed objects, such as packed drawing objects 941 (FIG. 9(*b*)), and to retrieve custom properties in response to requests by controls.

In the embodiment, a property search begins in the state property section 926. After the state property section 926 is searched, a jump may be made to a higher level property section (e.g, the part property section 924, class property section 922, or global property section 908) for further searching. The jump does not need to be to the next highest level in the hierarchy. For example, the jump could be made from the state property section 926 to the class property section 922, skipping the part property section 924.

If the property sought for a control is not found in a lower level property section, such as the state property section 926, a jump-to-parent reference 930 at the end of the lower level property section may direct the theme manager 216 to continue the search in a higher level section, such as the class property section 922. In the example, the class property section 922 is considered the parent section of the state property section 926 for the control. When the theme manager 216 searches for a particular property in a property data section, the theme manager 216 steps through and reads each property data item 931, determining whether the property data item 931 matches the desired property. If none of the property data items 931 match the desired property in the current property data section, the theme manager 216 will use the jump-to-parent section 930 to jump to the next defined parent property data section. The theme manager 216 will continue searching for the desired property in the associated parent section. The jump-to-parent section 930 is in the form of a property data item 931, which will be discussed next.

Turning to FIG. 9(*b*), there is shown an example of a property data item 931. Property data item 931 consists of derived property ID 932, primitive property ID 933, property data length 934, property data 935. Derived property ID 932 contains a numeric identifier for the particular part of the component to be rendered. For example, derived property ID 932 might be 45, which could indicate that the value that follows is the color to be used when rendering text in the component to be rendered. Primitive property ID 933 contains a numeric identifier for the type of the derived property 932. For example, if the derived property ID 932 indicates Text Color, primitive property ID 933 would be the identifier for color. Thus, property data 935 would be data for the color of the text. Property data length 924 is the length in bytes of the property data that follows. This is useful in jumping quickly past unneeded properties. For example, if a "color text" property with ID "45" where being searched for in the hierarchy, the search could look at the property ID 922 of the data item and, if it didn't equal "45", add the data length 924 to a current data pointer to index directly to the next data property. When the property data item 931 is a jump-to-parent reference 930, the property data 935 is an offset to the associated parent section.

Referring again to FIG. 9(*b*), there is shown a packed objects section 918. The packed objects section 928 is in binary format and is preferably located after the hierarchical data section 916 as shown in FIG. 9(*a*). In one embodiment, the packed objects section 918 contains a drawing objects section 936, a custom region data section 937, a sampled colors section 938, and a text objects section 939. As will be shown in more detail, each of the sections 936, 937, 938, and 939 are fixed structures of property data created from the hierarchical class sections of binary file format 902. As will be shown, the format of the fixed structures in the packed objects section 918 optimizes the speed of property retrieval.

An exemplary embodiment of the drawing objects section 936 is shown in more detail beside the packed objects section 918. In this embodiment, each unit of drawing object data consists of a drawing object 941 and an associated drawing object header 940. A drawing object 941 is a fixed structure created from the data in the hierarchical binary file format 902. In this embodiment, a packed drawing object is created for classes, parts, and states that specify one or more image file or BorderFill property. The theme manager 216 searches the binary file format 902 using the jump-to-parent references 930 as discussed earlier, and creates a drawing object 941 and drawing header 940 for every unique part and state number combination that have at least one instance of an Imagefile property and Borderfill property. Each state property, part property, class property, and global property, as appropriate, is gathered from the hierarchy and put into a drawing object 941. In the example embodiment shown in FIG. 9(*b*), two types of structures exist, an Imagefile structure and a Borderfill structure. For every part or state for which a packed data object is created, an offset value is put into the beginning of the part jump table 920, indicating where the first packed object for the class is located in the shared data 252.

Although the packed drawing objects are preferably stored sequentially following the hierarchal property data section for a class, at runtime the theme manager 216 creates another set of data structures to optimize access to the packed objects using a separate set of part/state jump tables to obtain a direct pointer to the correct drawing object. Exemplary embodiments of these data structures are shown in FIG. 9(*d*).

Referring to FIG. 9(*d*) there is illustrated an exemplary embodiment of a class object data structure 980 that facilitates access to packed drawing objects in the packed object section 918. The class object data structure 980 includes a part count 982 and a part information array 984. The part information array 984 is an array of part information structures 986, which contain offset information associated with a class. The part count 982 is the number of part information structures 986 in the part information array 984. The part count 982 can be viewed as the number of parts associated with the control for which packed drawing objects have been created.

The part information structure 986 includes a state count 988, a part drawing object pointer 990, a part text object pointer 992, a state drawing object pointer array, and a state text object pointer array 996. The state count 988 is the number of states associated with a part. The state count 988 gives the length of the state drawing object pointer array 994 and the state text object pointer array 996. The part drawing object pointer 990 is a reference, or offset, to an associated part drawing object in the drawing objects section 936. The part text object pointer is an offset to an associated text object in the text objects section 939. The state drawing object pointer array 994 is an array of offsets to a set of associated state drawing objects in the drawing objects section 936. The state text object pointer array 996 is an array of offsets to a set of associated state text object in the text objects section 939.

After the structures shown in FIG. 9(*d*) have been created, whenever the properties are requested for a part and state associated with a drawing object 941, the requesting control passes in a part ID and state ID. The part information array 984, in the class object data structure 980, is indexed with the Part ID to obtain an associated part information structure 986. It is determined whether a valid state drawing object pointer 994 exists in the part information structure 986. If the state drawing object pointer array is not valid (e.g., a pointer not allocated), the part drawing object pointer 990 is used to obtain the associated part-level drawing object. Note that class level properties are treated internally as "part 0" objects (since real part numbers are allocated starting at "1"). If the array of state drawing objects is valid, the state drawing object pointer array 994 is indexed with the state ID and a direct pointer to a drawing object 941 is obtained.

The drawing object 941 is accessed and provides all the necessary property data, eliminating the steps of scanning the hierarchy of the binary file format 902. Importantly, a drawing object 941 for the Imagefile property structure typically provides offsets into the custom region data section 937 and the sampled colors section 938. Exemplary property data associated with the drawing object 941 is shown in FIG. 9(c).

Figure 9A:
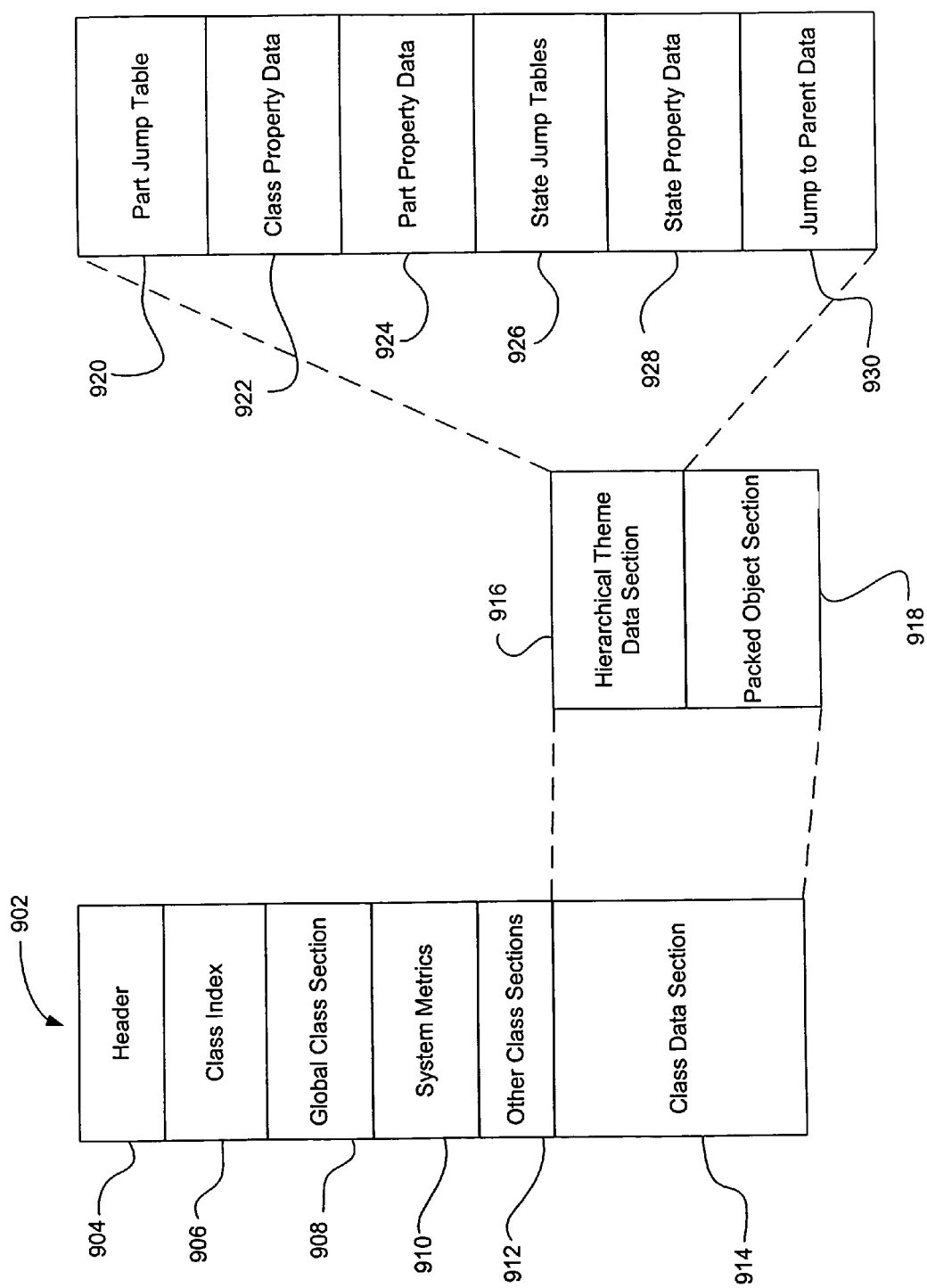
FIG. 9(a)-(d) illustrates an exemplary format and structure of the binary theme file and packed objects sections.
Figure 9B:
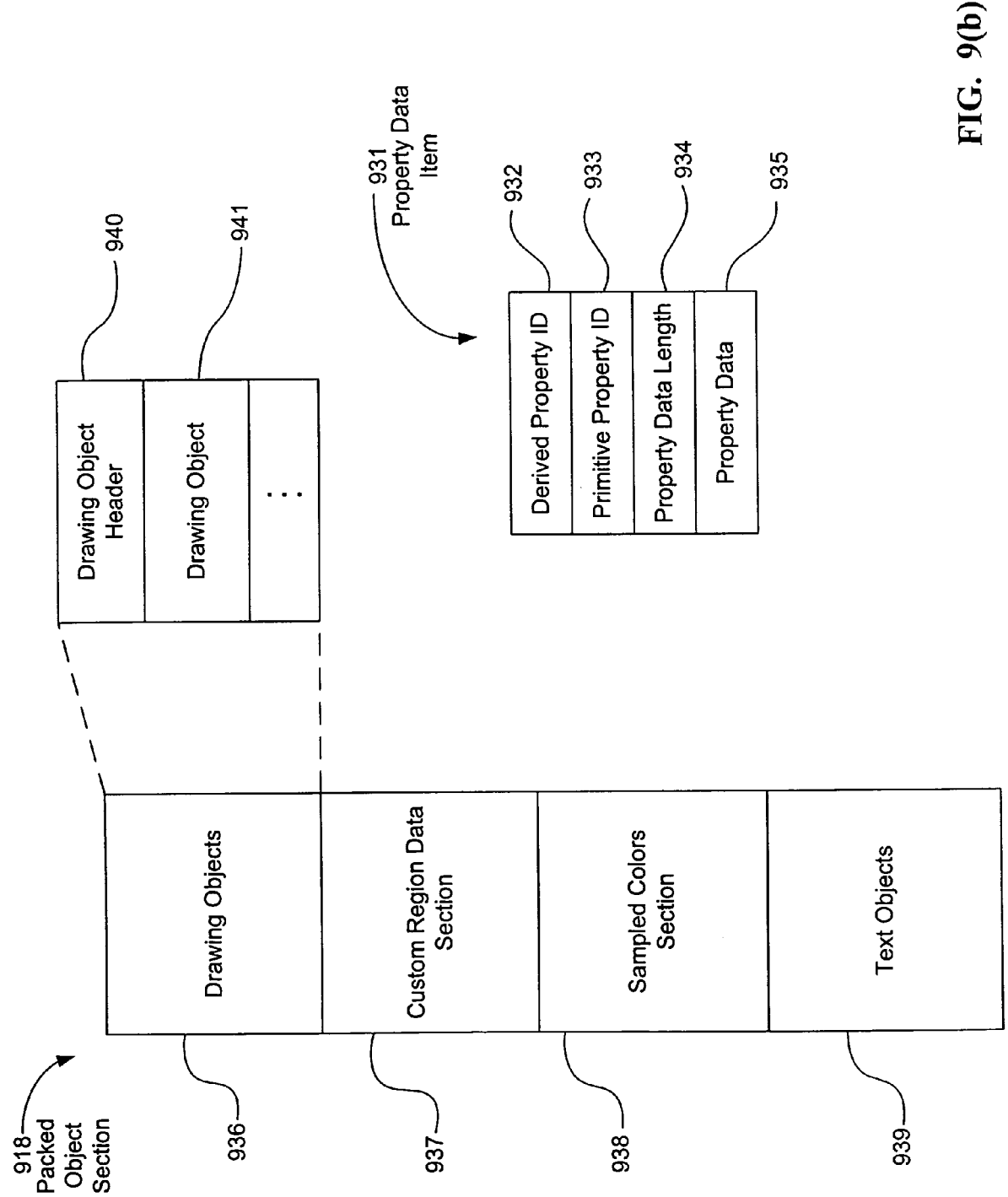
Figure 9C:
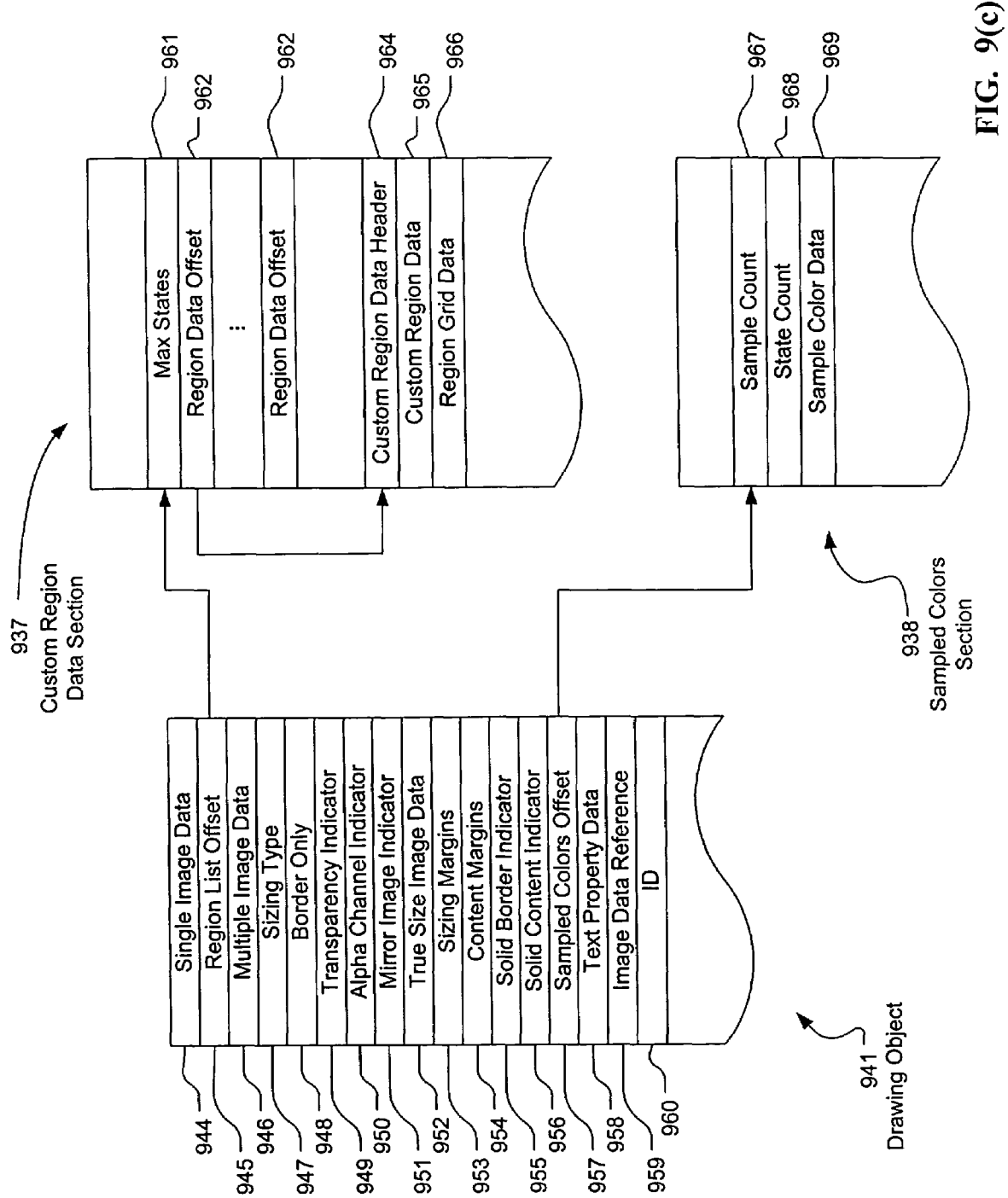
Figure 9D:
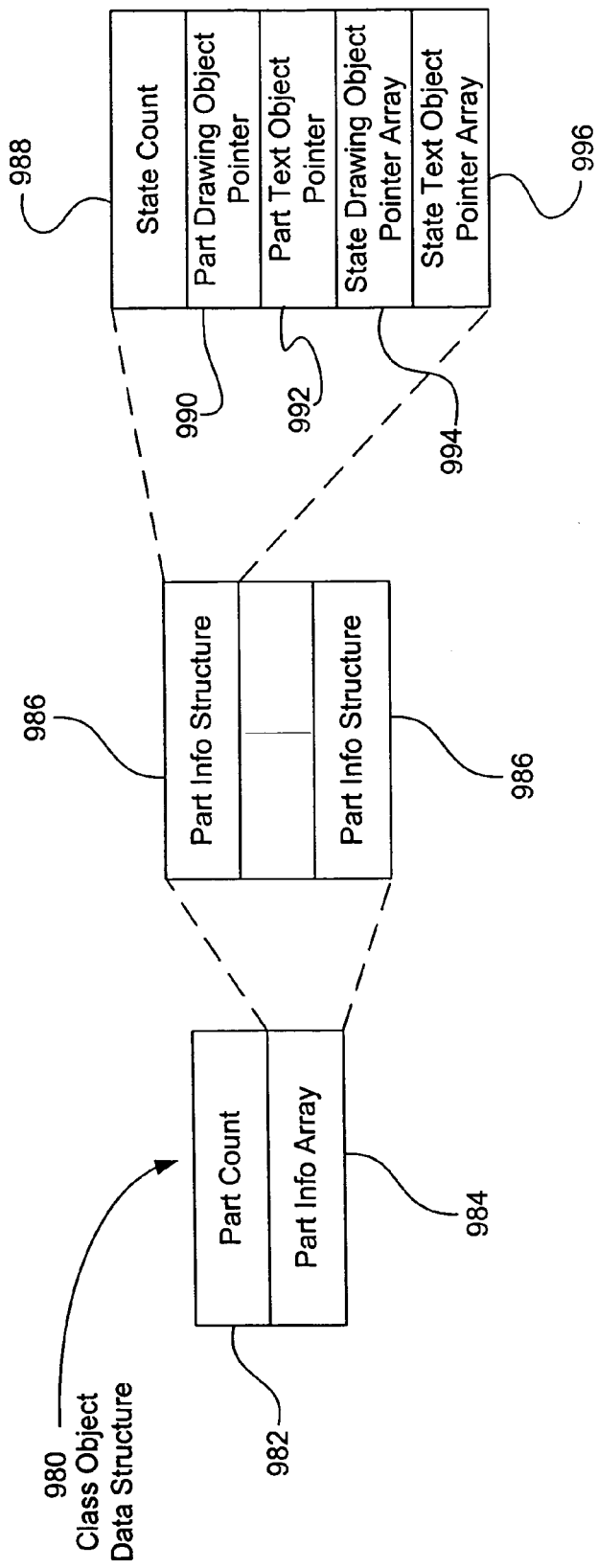

Shown in FIG. 9(c) is an embodiment of a drawing object 941 having an Imagefile structure. The Imagefile structure is used for parts and states that have one or more images as a property. A single image data section 944 can provide data including, but not limited to, device independent bitmap (DIB) data offset, image count, image layout, image height, and image width. A region list offset 945 is an offset into the custom region data section 937, and will be discussed in more detail. A multiple image data section 946 can provide data including, but not limited to, multiple image offsets and file sizes. A sizing type indicator 947 indicates the type of sizing. Sizing types include, but are not limited to, stretching, tiling, and true size. A border only indicator 948 indicates that only the border grids of the image should be rendered.

A transparency indicator 949 is provided to indicate whether there are transparent parts in an image. An alpha channel indicator 950 indicates whether alpha channel processing should be applied to the image. Alpha channel is eight bits in a 32-bit graphics pixel that is used as a separate layer for representing levels of transparency in an object. As will be discussed in more detail, the transparency indicator 949 and alpha channel indicator 950 are preferably used to determine whether the region list offset 945 is used. A mirror image indicator 951 indicates whether the image should be mirrored (flipped horizontally) when rendered in a mirrored device context. A true size image data section 952 provides property data for true size images and is used if the sizing type 947 is true size. Sizing margins 953 and content margins 954 provide property data for the margins that define the grids and the position of an image. Grids will be discussed in more detail with reference to FIG. 10.

A solid border indicator 955 and a solid content indicator 956 each indicate whether an image has solid colors associated with it, and is used to determine whether the sampled colors section 938 may be used to render the image. If the solid border indicator 955 or solid content indicator 965 are true, then sampled colors offset 957 is used to index the sampled color data from the associated section of the sampled colors section 938, from which, the image can be rendered more quickly. A text property data section 958 provides text property data including, but not limited to, font, color, and size. An image data reference 959 provides a reference to image data when a component does not have an associated theme file. A part and state identifier 960 is provided to associate the draw object 941 with a part and state.

Turning now to the custom region data section 937 shown in FIG. 9(c), there is shown one possible embodiment of the custom region data section 937. In this embodiment there is custom region data for multiple states. Thus, a section, such as max states 961, provides the number of states for which there is custom region data. The region list offset 945 of the drawing object 941 refers to the max states section 961. One or more region data offsets 962 provide the offsets for each element of custom region data. As shown in FIG. 9(c), a region data offset 962, refers to a custom region data header 964. Region data header 964 includes a part number and state number associated with the drawing object 941. A custom region data section 965 contains data defining the borders of nontransparent (clickable) regions of an image. Custom region data 965 is preferably in the form of coordinate points, and will be discussed in more detail in reference to FIG. 10. A region grid data section 966 is a list of reference grids related to the points in the custom region data 965, and will be discussed in more detail in reference to FIG. 10.

FIG. 9(c) also illustrates an embodiment of the sampled colors section 938. As was mentioned earlier, sampled colors offset 957 of the exemplary drawing object 941, is an offset to the sampled colors section 938. In this embodiment, the sampled colors offset 970 points to a sample count section 967. The sample count section 967 provides the number of samples in each state. A state count section 968 provides the number of states for which sample data is provided in a sample color data section 969. The sample color data section 969 of FIG. 9(c) contains an array of color references associated with a state.

The sample color data section 969 is typically a structure containing a plurality of arrays having color data. A COLOR-REF is a typically a "DWORD", meaning 4 bytes. The bytes represent the value for Red, Green, Blue, and Alpha. For example, red=0 means there is no red in the color and red=255 means the color contains the maximum amount of red. Also, alpha=0 means the color is completely transparent/invisible. alpha=255 means the color is opaque and has no transparency. Shown in Table 1 below is an exemplary layout for the sampled colors data section 969:

TABLE 1

| struct SAMPLEDCOLORS | |
| --- | --- |
| { | |
| COLORREF crContent; | |
| COLORREF crLeftBorderColors[ ]; | // array of colors (length=SizingMargins.left) |
| COLORREF crRightBorderColors[ ]; | // array of colors (length=SizingMargins.right) |
| COLORREF crTopBorderColors[ ]; | // array of colors (length=SizingMargins.top) |
| COLORREF crBottomBorderColors[ ]; | // array of colors (length= SizingMargins.bottom) |
| }; | |

Figure 10:
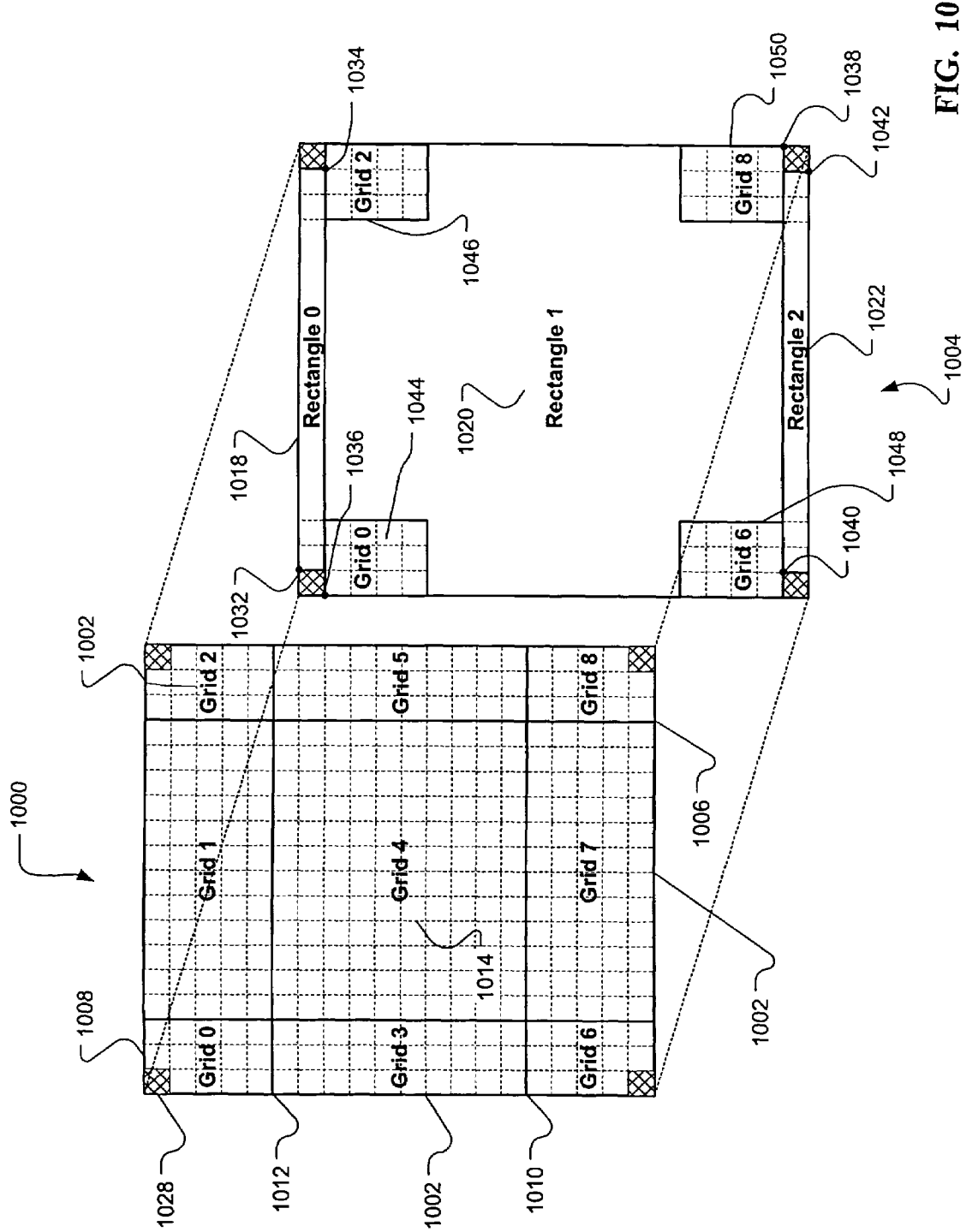
FIG. 10 illustrates an exemplary representation of an image with transparent parts in an embodiment of the present invention.

Referring to FIG. 10, shown therein is a logical representation of an image 1000 in an embodiment of the present invention. An image is comprised of a plurality of pixels. In the example of FIG. 10, the image 1000 is 18 pixels wide and 20 pixels tall. Each pixel has an associated color value. Image 1000 can be viewed as a rectangular image with grids 0-8 (1002). Also shown in FIG. 10 is a regional mapping overlay 1004 that will be discussed later.

Each grid 1002 is defined by a set of sizing margins. Exemplary sizing margins in FIG. 10 are right sizing margin 1006, left sizing margin 1008, bottom sizing margin 1010, and top sizing margin 1012. Thus, for example, grid 4 (1014) has a top boundary of top sizing margin 1012, a bottom boundary of bottom sizing margin 1010, a left boundary of left sizing margin 1008, and a right boundary of right sizing margin 1006. The boundaries of the image are easily determined from the sizing margins. For example, in FIG. 10, top sizing margin 1012 has a value of five because it is five pixels vertically below the top boundary of the image 1000. Similarly, bottom sizing margin 1010 has a value of five because it is five pixels vertically above the bottom boundary of the image 1000. Similarly, left sizing margin 1008 has a value of three and right sizing margin 1006 has a value of three. The sizing margin values used for the example of FIG. 10 are examples used for illustration purposes only and can be any values such that they define grids 1002 of an image 1000.

Also shown in the exemplary image of FIG. 10 are four transparent parts 1028 of the image. Transparent parts are parts of the image through which whatever is behind them is visible to the computer user. Also, transparent parts are parts of the image that the user is not able to "click" on with the mouse pointer. Nontransparent parts of an image are clickable and transparent parts are non-clickable. If a computer user positions the mouse pointer over an image and clicks, it must be determined whether the user has clicked on a transparent part or a non-transparent part. Clicking on a transparent part will generally result in no computer processing action, whereas clicking on a nontransparent part will generally result in computer processing action. Thus, it is necessary to logically represent and distinguish between the positions and sizes of nontransparent parts and those of transparent parts. The logical representation of FIG. 10 illustrates how one embodiment of the present invention logically represents clickable image parts and non-clickable image parts in memory.

In the example image of FIG. 10, each transparent part 1028 is one pixel in size in a corner of the image; however, each transparent part 1016 can be located anywhere in the image and be of any size or shape. The present embodiment defines borders of image regions, such as rectangle 0 (1018), rectangle 1 (1020), and rectangle 2 (1022). The border definitions, combined with the grid boundaries 1002, are sufficient data to define the positions and sizes of transparent parts 1028. For example, rectangle 0 (1018) is bounded on the left by a transparent part 1024 and on the right by transparent part 1026. Rectangle 1 (1020) is bounded on the top left by transparent part 1024, on the top right by transparent part 1026, on the bottom left by transparent part 1028, and on the bottom right by transparent part 1030. Rectangle 2 (1022) is bounded on the left by transparent part 1028 and on the right by transparent part 1030.

As will be shown, six points, each having two values, and six grid numbers are preferably stored to define the borders of transparent parts 1028 of the exemplary image 1000 of FIG. 10. The positions of nontransparent regions, rectangle 0 (1018), rectangle 1 (1020), and rectangle 2 (1022) are each defined by two points. Point 1032 and point 1034 define the boundaries of rectangle 0 (1018). Point 1036 and point 1038 define the boundaries of rectangle 1(1020). Point 1040 and point 1042 define the boundaries of rectangle 2 (1022). Each of the points 1032, 1034, 1036, 1038, 1040, and 1042 has a pair of values, the first value (an "x" value) defining a horizontal offset from a vertical reference line, the second value (a "y" value) defining a vertical offset from a horizontal reference line. Grid 0 (1044), grid 2 (1046), grid 6 (1048), and grid 8 (1050) are superimposed on regional mapping overlay 1004 to illustrate how vertical reference lines and horizontal reference lines are determined.

In the example of FIG. 10, the point 1032 has an x, or horizontal offset value, of one. Point 1032 has a 'y', or vertical offset value, of zero. As mentioned earlier an associated grid number is stored for each point. In the case of the example point 1032, the grid number stored is grid 0 (1044). In this representation, the 'x' value of point 1032 is relative to the left vertical boundary of grid 0 (1044), and the 'y' value of point 1032 is relative to the top horizontal boundary of grid 0 (1044). Continuing with the example, the point 1034 has an 'x' value of two and a 'y' value of one, with the associated grid, grid 2 (1046). Thus, the horizontal and vertical offsets of point 1034 are measured from the left boundary of the grid 2 (1046) and the top boundary of grid 2 (1046), respectively. The logical representation using the points 1032 and 1034 thus sufficiently define the boundaries of the rectangle 0 (1018).

The boundaries of the exemplary regions, rectangle 1 (1020) and rectangle 2 (1022), are represented in a similar fashion. Thus, the point 1036 has an 'x' value equal to zero and a 'y' value equal to one. The associated reference grid number is zero for point 1036 because the point 1036 is located relative to grid 0 (1044). The point 1038 has an 'x' value equal to three and a 'y' value equal to four, and the associated reference grid 8 (1050). With the point 1036 and the point 1038, the boundaries of the rectangle (1020) are defined. Likewise, the point 1040, with 'x' value of one and 'y' value of four, and the associated reference grid 6 (1048), describe the left and top boundaries of the rectangle 2 (1022). The point 1042, having 'x' value of two and 'y' value of five, and the associated reference grid 8 (1050), define the right boundary and bottom boundary of rectangle 2 (1022).

Figure 11:
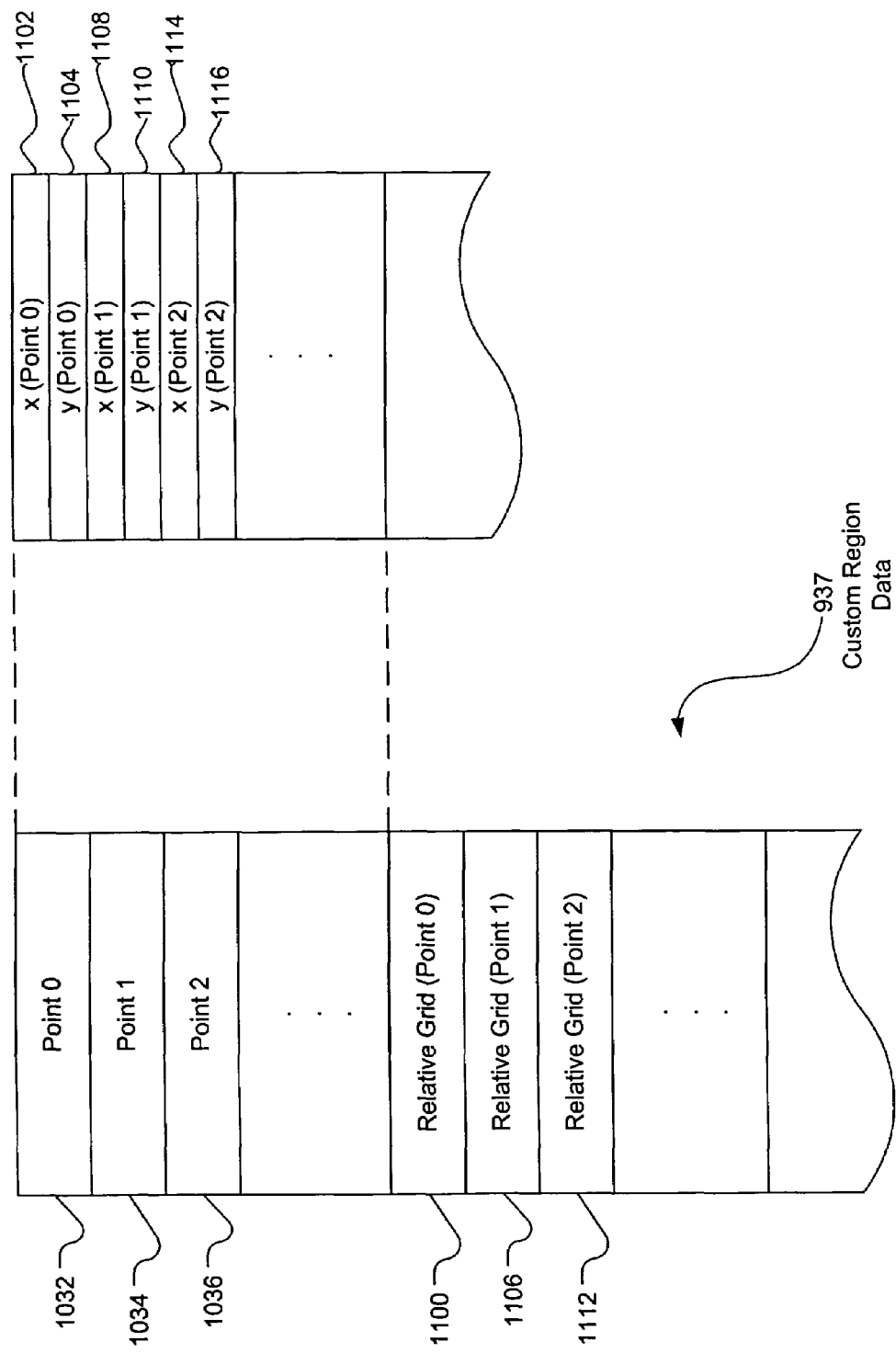
FIG. 11 illustrates the structure of the custom region data in accordance with a preferred embodiment of the present invention.

The values described in FIG. 10 are stored in a data structure described in FIG. 11. Referring now to FIG. 11, shown therein is a custom region data structure 965 having point data and reference grid data. Continuing with the example image of FIG. 10, a point is stored, such as point 0 (1032), that gives a horizontal offset from the top border of a reference grid and a vertical offset from the left border of a reference grid. A reference grid is stored so that the absolute location of the border of a nontransparent part can be calculated. In the case of point 0 (1032), the associated relative grid is stored in section relative grid (point 0) (1100). The horizontal offset value associated with point 0 (1032) is stored in section x (point 0) 1102 and the vertical offset value associated with point 0 (1032) is stored in section y (point 0) 1104. Similarly, point 1 (1034) has an associated reference grid, relative grid (point 1) (1106), associated horizontal offset value x(point 1) 1108, and associated vertical value y(point 1) 1110. To illustrate further, point 2 has an associated reference grid, such as relative grid(point 2) 1112, associated horizontal offset value x(point 2) 1114, and associated vertical offset value y(point 2) 1116. Any number of points, associated grids, associated horizontal offsets, and associated vertical offsets can be stored for any number of transparent regions.

During run time, drawing object images often need to be resized to draw image parts into sizes and locations specified by the control. Likewise, the transparent regions of the resized image part need to be determined. The prior art approach is to size the image and then convert the newly sized image into a transparency region. This process is very expensive because it involves "walking the pixels" in the image to determine which are transparent. The custom region data 965 allows the image parts to be quickly resized using the 9-grid parameters of the associated image.

After data structures such as those shown in FIG. 11 are constructed, an image can be resized and displayed quickly and efficiently by determining transparent regions prior to resizing the image. A point, such as point 0 (1032), is transformed into a transformed point identifying vertical and horizontal boundary lines of a transparent region. Transforming a point includes adding an x value, such as x (point0) 1102, to a location of a vertical grid boundary, such as the left boundary of relative grid (point 0) 1100, to obtain a vertical boundary line for a transparent region, such as the transparent region 1028 of FIG. 10. Transforming a point also includes adding a y value, such as y (point0) 1104, to a location of a horizontal grid boundary, such as the top boundary of relative grid (point0) 1100, to obtain a horizontal boundary line for a transparent region, such as transparent region 1028. Transforming a point can also include scaling a point.

One possible implementation of a method of transforming the points of FIG. 11 to yield boundaries of transparent regions is shown in Table 2.

TABLE 2

```
for (int i=0; i < cPoints; i++, pt++, pByte++, ptNew++)
// transform each "point"
{
   switch (*pByte)
   {
      case GN_LEFTTOP:      // left top : grid 0
         ptNew->x = pt->x + iLeftXOffset;
         ptNew->y = pt->y + iTopYOffset;
         break;
      case GN_MIDDLETOP:    // middle top : grid 1
         ptNew->x = (pt->x*iXMult)/iXDiv + iMiddleXOffset;
         ptNew->y = pt->y + iTopYOffset;
         break;
      case GN_RIGHTTOP:     // right top : grid 2
         ptNew->x = pt->x + iRightXOffset;
         ptNew->y = pt->y + iTopYOffset;
         break;
      case GN_LEFTMIDDLE:   // left middle : grid 3
         ptNew->x = pt->x + iLeftXOffset;
         ptNew->y = (pt->y*iYMult)/iYDiv + iMiddleYOffset;
         break;
      case GN_MIDDLEMIDDLE: // middle middle : grid 4
         ptNew->x = (pt->x*iXMult)/iXDiv + iMiddleXOffset;
         ptNew->y = (pt->y*iYMult)/iYDiv + iMiddleYOffset;
         break;
      case GN_RIGHTMIDDLE:  // right middle : grid 5
         ptNew->x = pt->x + iRightXOffset;
         ptNew->y = (pt->y*iYMult)/iYDiv + iMiddleYOffset;
         break;
      case GN_LEFTBOTTOM:   // left bottom : grid 6
         ptNew->x = pt->x + iLeftXOffset;
         ptNew->y = pt->y + iBottomYOffset;
         break;
      case GN_MIDDLEBOTTOM: // middle bottom : grid 7
         ptNew->x = (pt->x*iXMult)/iXDiv + iMiddleXOffset;
         ptNew->y = pt->y + iBottomYOffset;
         break;
      case GN_RIGHTBOTTOM:  // right bottom : grid 8
         ptNew->x = pt->x + iRightXOffset;
         ptNew->y = pt->y + iBottomYOffset;
         break;
   }
}
```

Figure 12:
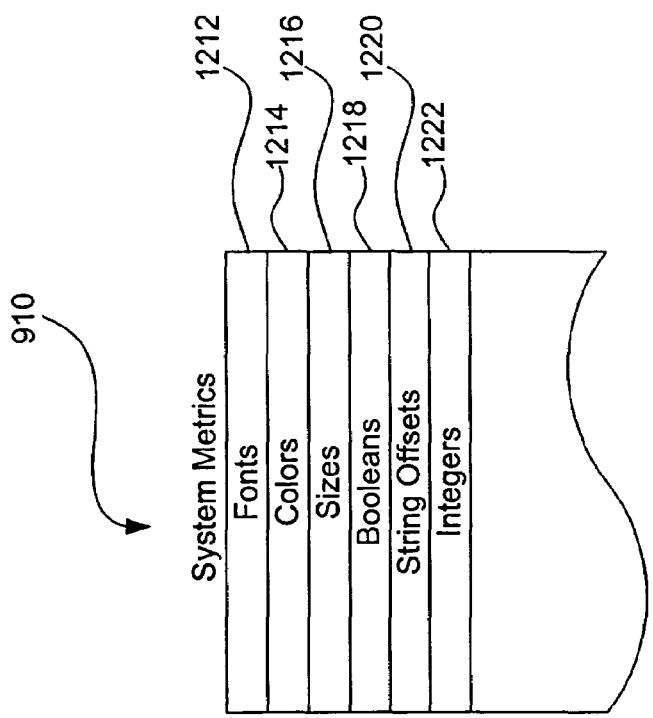
FIG. 12 illustrates the structure of the text objects and system metrics sections in accordance with a preferred embodiment of the present invention.
Figure 12:
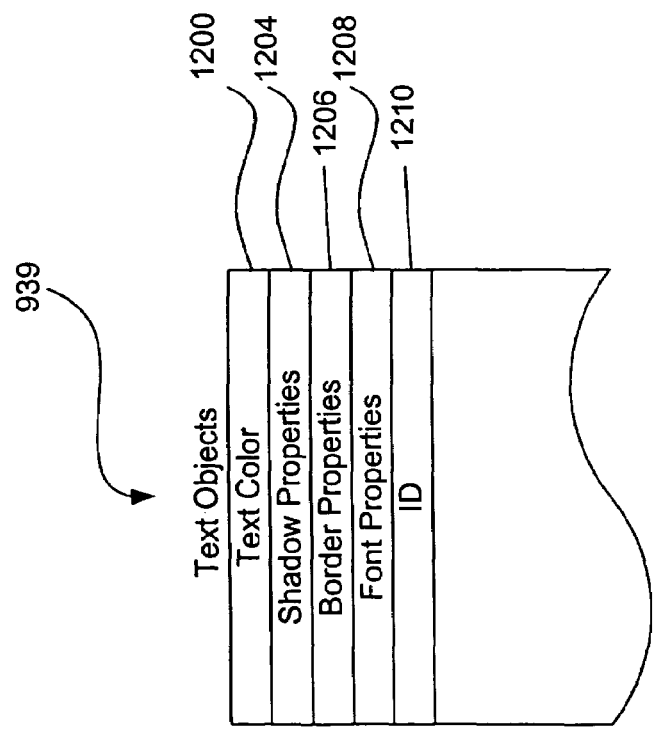

Turning now to FIG. 12, shown therein are exemplary embodiments of the binary format of the text objects section 939 and the system metrics section 910. Like the other packed objects sections discussed previously, the text objects section 939 is a binary structure having all the necessary theme property data for a particular type of graphical component. The text objects section 939 has theme property data for graphical text components that is obtained from the class, part, and state property data sections (922, 924, and 928) of the binary file format 902.

The theme manager 216 searches the classes' hierarchal property section in the binary file format 902 and creates a text object and drawing header 940 for every unique part and state number combination that have at least one instance of a TextDraw property. For every unique combination of state and part having a TextDraw property, every state property, part property, class property, and global property associated with the combination is gathered from the hierarchy and put into a text object. When text of a control is to be rendered or measured, the control calls one of the text theme API's, passing a plurality of parameters, including, but not limited to, an associated theme handle (which is an indirect pointer to the control's associated class object in the class object data structure 980), and part and state IDs. The associated text object is retrieved using the class object and part and state IDs, in a similar manner to how drawing objects are retrieved (as described above, using FIG. 9(d)).

The text objects section 939 contains a text color data section 1200 having the color of the text. A shadow properties section 1204 can provide any shadow property data, including but not limited to, a shadow position, a shadow color, a shadow type, and a shadow indicator, indicating whether a shadow should be applied. A border properties section 1206 preferably provides text border property data such as border size and border color. A font properties section 1208 preferably provides a font type and a font indicator, indicating whether a font should be applied. A graphical component identifier, such as ID 1210, stores the associated graphical component part identifier and state identifier.

Turning now to the exemplary system metrics data section 910, of FIG. 12, shown therein are a fonts section 1212, a colors section 1214, a sizes section 1216, a Booleans section 1218, and a string section 1220. As mentioned earlier, these sections can be used to store property data for applications that are not theme aware, so that the application appears as close to the theme as possible.

Figure 13:
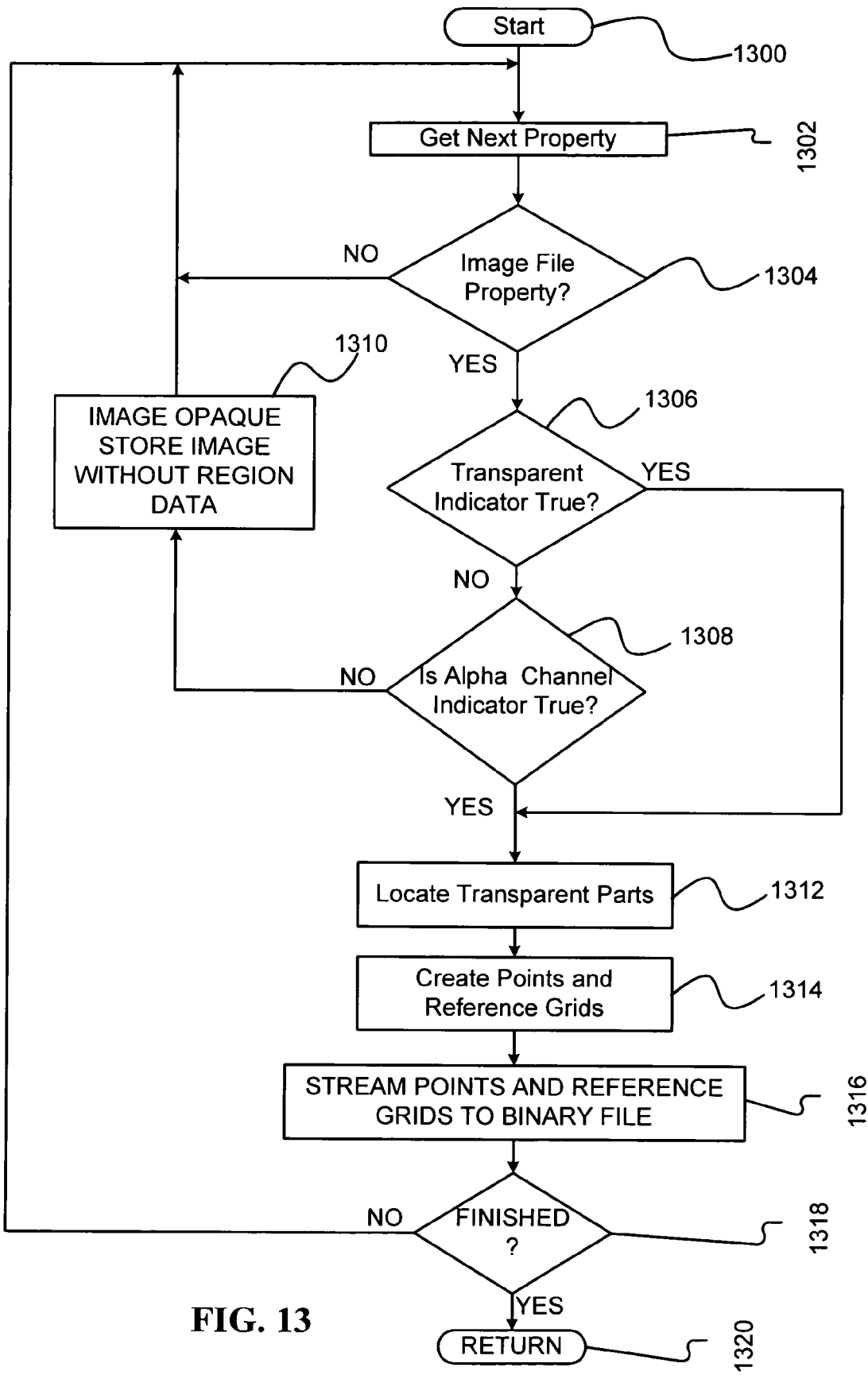
FIG. 13 is a flow chart illustrating a method of constructing a custom region data section in accordance with a preferred embodiment of the present invention.

Referring to FIG. 13, shown therein is an embodiment of a method of building a custom region. Control begins at start operation 1300 wherein startup initialization is performed. Control then transfers to the get next property operation 1302 wherein the next property in the hierarchical structure of the binary file format 902 is selected. Control then transfers to the determining operation 1304 wherein it is determined whether the selected property is an image file property. If it is not an image file property, control transfers back to the get next property operation 1302.

If, on the other hand, the selected property is an image file property, control transfers to the determining operation 1306 wherein it is determined whether the transparent indicator is set to true for the class, part, or state associated with the selected property. If the transparent indicator is not set to true, control transfers to determining operation 1308 wherein is determined whether the alpha channel indicator is set to true for the class, part, or state associated with the selected property. If the alpha channel indicator is not set to true, control transfers to storing operation 1310 wherein the image is stored without custom region information, because the image has no transparent or alpha channel parts.

If, on the other hand, either the transparent indicator is true in the determining operation 1306, or the alpha channel indicator is true in determining operation 1308, control transfers to locating operation 1312. In the locating operation 1312, the borders of the transparent regions of the image are located. After the transparent regions are located, control transfers to creating operation 1314, wherein the points and grids discussed with reference to FIG. 11 are created using border locations found in operation 1312. Control then transfers to the streaming operation 1316 wherein the point data and grid reference data are stored in binary format in the custom region data section 934 as shown in FIG. 11. After the custom region data is stored, control transfers to determining operation 1318 wherein it is determined whether all the properties have been processed. If not, control transfers back to the get next property operation 1302 to begin processing the next theme property of the binary file format 902. If all of the properties have been processed, control transfers to return operation 1320 wherein control is transferred back to the calling function.

Figure 14:
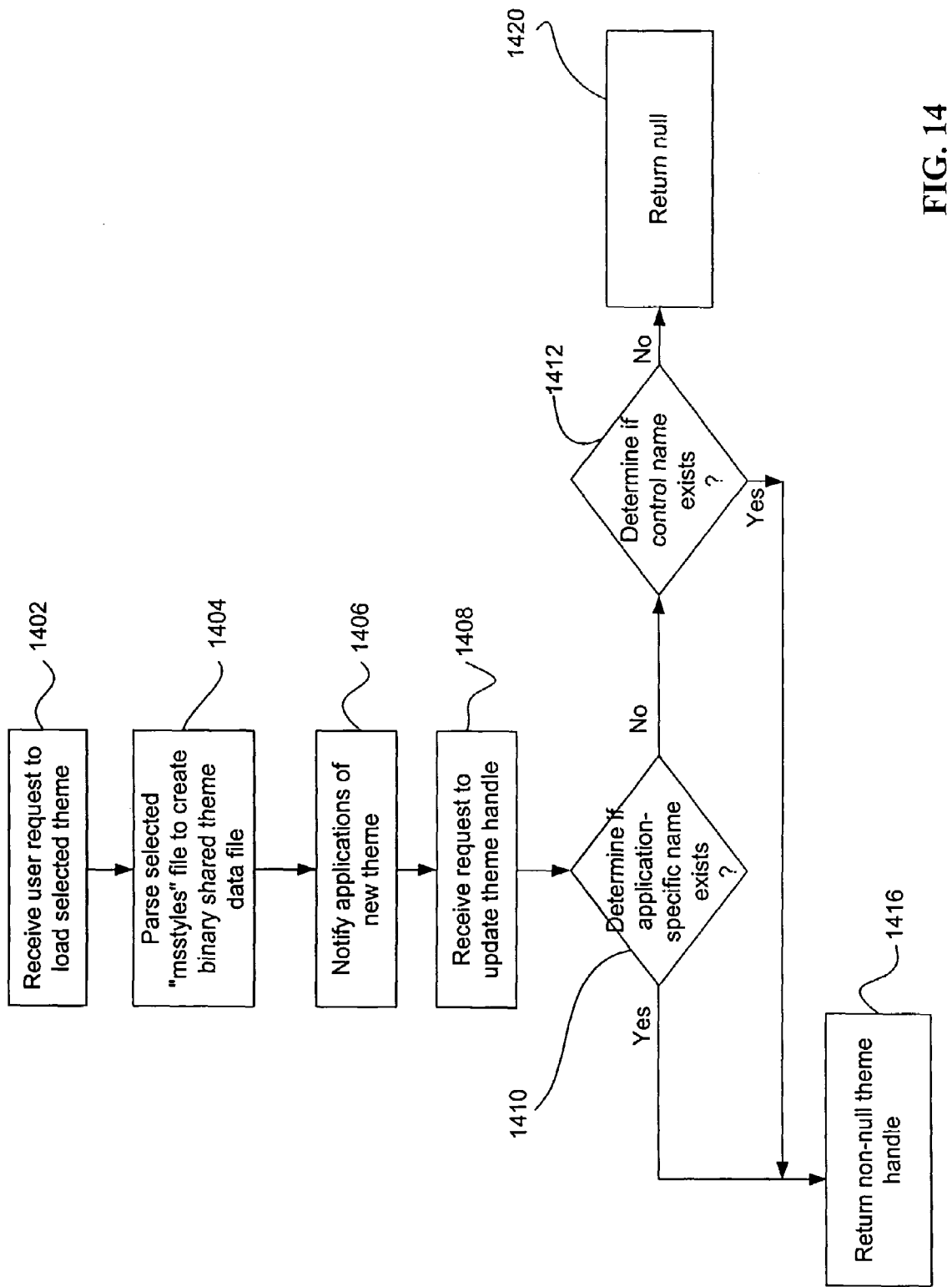
FIG. 14 is a flow control diagram illustrating the theme update process.

Referring now to FIG. 14, there is shown a flow control diagram illustrating one embodiment of a method of loading a newly selected theme in the system. Control begins with a receiving operation 1402. When the user selects a new theme (e.g., Business theme), the theme manager 216 uses a utility API 222 to load the theme(e.g., Business.msstyles 226) into shared theme data 252. Control then transfers to a parsing operation 1404, wherein the utility API 222 parses text data in Business.msstyles and creates a binary version of the component and theme property data contained therein. Creation of a binary file format 902 involves parsing the themes.ini 236 text file and the class data text file 238 and then building the header 904, class index table 906, and class sections 908, 912, and 914 for each class in the class data file 238.

Control then transfers to a notifying operation 1406 wherein the theme manager 216 sends a message to all running applications 135 that a new theme has been loaded into the shared theme data 252. In response to the notification message, themeable applications 135 will request a new theme handle used by the theme manager 216 to index into shared theme data 252. Subsequently, control transfers to a receiving operation 1408 wherein the theme manager 216 receives a request to update the theme handle for a control. The request typically includes one or more control class names. The request may also include an application name if the requesting control has application-specific theme properties. In response to the request, control transfers to a determining operation 1410 wherein the theme manager 216 performs a string comparison between the requesting class (and optional application) name and the class name strings of class index 906.

As was discussed previously, the class index 906 contains entries for each class defined in the class data file 238. Each of these entries contains a single class name; some of them also contain an optional application name. After the receiving operation 1408, control transfers to the determining operation 1410 wherein, if the requesting control has passed in a non-NULL application name, the entries of class index 906 having an application name matching the passed in application name are searched first. If the class name of one of application-specific entries matches one of the class names passed in by the control (in the list of class names), a match is found and control transfers to a returning operation 1416.

If, in the determining operation 1410, no match is found by searching the matching application name entries, or if the calling control passed a NULL application name, then control transfers to a determining operation 1412 wherein the entries of the class index 906 with a NULL application name are searched. If the class name of one of these entries matches one of the class names passed in by the control (in the list of class names), a match is found and control transfers to the returning operation 1416. In the returning operation 1416, a non-null theme handle associated with the class entry is returned to the requesting control.

If, in the determining operation 1412, no control class name is found for the requested control, operation transfers to a returning operation 1420 wherein theme manager 216 returns a null to the requesting control. A null indicates that no theme information was found for the specified application and list of class control names in the shared theme data 252.

After a theme handle is obtained, components are rendered by calling the drawing APIs 218 of theme manager 216 as discussed earlier. A component that requires rendering passes its handle, part, and state to the theme manager 216. The theme manager 216 uses the theme handle to get the associated class object which locates the correct drawing object or text object, as previously described.

For individual property retrieval API requests from the control, the theme manager 216 translates the theme handle into a class object. From the class object, a pointer to the associated class section in the binary theme data is obtained. Then, the hierarchal property section is searched for the property as follows: The theme manager searches the state property section 916 and returns property data defined for the component, part, and state if it is found. If state properties are not found, part property data 913 is searched for property data defined for the component and part. If part property data is defined it is returned. If part property data is not defined, there is a jump to class data section 911. Theme manager 216 searches class data section for theme property data specific to the requesting component for the application. If the desired data is found it is returned. If not theme manager jumps to the global section 910 where globally generic property data is identified and returned.

While the invention has been particularly shown and described with reference to preferred embodiments thereof, it will be understood by those skilled in the art that various other changes in the form and details may be made therein without departing form the spirit and scope of the invention.

What is claimed is:

1. A method of applying a theme in a computer system having a graphical operating system and applications running thereon comprising:
   receiving a user request to use a user selected theme defined by a text theme file;
   creating a binary file from the text theme file;
   loading the binary file into a shared memory area, capable of being shared by all applications;
   notifying running applications that there is a new theme;
   receiving a handle update request from a running application, the request having an application name;
   searching for the application name in the binary file;
   determining if the application name is in the binary file;
   locating a theme handle in the binary file if the application name exists in the binary file; and
   returning the located theme handle to the requesting application whereby theme properties can be applied to the application.

2. The method of claim 1 further comprising translating the theme handle into a class object.

3. The method of claim 1 wherein the class object provides a pointer to an associated class section in a binary theme data.

4. The method of claim 1 further comprising searching a hierarchical property section.

5. The method of claim 1, wherein searching a hierarchical property section further comprises:
   searching a state property section; and
   returning property data defined for a component, part, and state.

6. The method of claim 1, further comprising:
   determining if part property data is defined;
   searching class data section for theme property data specific to a requesting component for the application if part property data is not defined; and
   returning the theme property data.

7. The method of claim 1 further comprising:
   identifying globally generic property data if the theme property data is not found; and
   returning the globally generic property data.

8. A computer storage medium readable by a computing system and encoding a computer-executable of instructions for executing a computer process for applying a theme in a computer system having a graphical operating system and applications running thereon, the computer-executable instructions comprising instructions for:

receiving a user request to use a user selected theme defined by a text theme file;

creating a binary file from the text theme file;

loading the binary file into a shared memory area, capable of being shared by all applications;

notifying running applications that there is a new theme;

receiving a handle update request from a running application, the request having an application name;

searching for the application name in the binary file;

determining if the application name is in the binary file;

locating a theme handle in the binary file if the application name exists in the binary file; and returning the located theme handle to the requesting application whereby theme properties can be applied to the application.

9. The computer storage medium of claim 8 further comprising computer-executable instructions for translating the theme handle into a class object.

10. The computer storage medium of claim 8 wherein the class object provides a pointer to an associated class section in a binary theme data.

11. The computer storage medium of claim 8 further comprising computer-executable instructions for searching a hierarchical property section.

12. The computer storage medium of claim 8, wherein the computer-executable instructions for searching a hierarchical property section further comprises computer-executable instructions for:

searching a state property section; and returning property data defined for a component, part, and state.

13. The computer storage medium of claim 8, further comprising computer-executable instructions for:

determining if part property data is defined;

searching class data section for theme property data specific to a requesting component for the application if part property data is not defined; and returning the theme property data.

14. The computer storage medium of claim 8 further comprising computer-executable instructions for:

identifying globally generic property data if the theme property data is not found; and returning the globally generic property data.

15. A method of applying a theme in a computer system having a graphical operating system and applications running thereon comprising:

receiving a user request to use a user selected theme defined by a text theme file;

creating a binary file from the text theme file;

loading the binary file into a shared memory area, capable of being shared by all applications;

notifying running applications that there is a new theme;

receiving a handle update request from a running application, the request having an application name;

searching for the application name in the binary file;

determining if the application name is in the binary file;

locating a theme handle in the binary file if the application name exists in the binary file;

translating the theme handle into a class object, wherein the class object provides a pointer to an associated class section in a binary theme data; and returning the located theme handle to the requesting application whereby theme properties can be applied to the application.

* * * * *